US012670327B2

(12) United States Patent
Somech et al.

(10) Patent No.: US 12,670,327 B2
(45) Date of Patent: Jun. 30, 2026

(54) DETECTING HALLUCINATION IN A LANGUAGE MODEL

(71) Applicant: Microsoft Technology Licensing, LLC, Redmond, WA (US)

(72) Inventors: Haim Somech, Ramat Gan (IL); Adi L. Miller, Ramat Hasharon (IL); Assaf Avihoo, Matan (IL); Amir Kantor, Haifa (IL)

(73) Assignee: Microsoft Technology Licensing, Redmond, WA (US)

(*) Notice: Subject to any disclaimer, the term of this patent is extended or adjusted under 35 U.S.C. 154(b) by 206 days.

(21) Appl. No.: 18/209,232

(22) Filed: Jun. 13, 2023

(65) Prior Publication Data

US 2024/0419912 A1 Dec. 19, 2024

(51) Int. Cl.
*G06F 40/30* (2020.01)
*G06F 40/40* (2020.01)

(52) U.S. Cl.
CPC .............. *G06F 40/30* (2020.01); *G06F 40/40* (2020.01)

(58) Field of Classification Search
CPC .... G06F 40/211; G06F 40/253; G06F 40/268; G06F 40/284; G06F 40/30; G06F 17/00; G06N 3/08
See application file for complete search history.

(56) References Cited

U.S. PATENT DOCUMENTS 10,121,025 B1 * 11/2018 Rice ........................ G06F 21/10
10,311,859 B2 6/2019 Lev-tov et al.
11,501,331 B2 * 11/2022 Smith ................ G06Q 30/0248
11,853,706 B2 * 12/2023 Hosseini-Asl ......... G06N 3/096
12,086,713 B2 * 9/2024 De Freitas Adiwardana .............. G06N 3/08
12,229,522 B2 * 2/2025 Gajek ................... G06F 40/289
2015/0248736 A1 * 9/2015 Myslinski ............. G06F 3/0488 705/319
2016/0048772 A1 * 2/2016 Bruno ...................... G06N 5/04 706/11

(Continued)

FOREIGN PATENT DOCUMENTS

CN 118535684 A * 8/2024 ........... G06F 16/367
JP 2023033135 A 3/2023

OTHER PUBLICATIONS

Huo et al., title={Retrieving supporting evidence for generative question answering}, booktitle={Proceedings of the annual international acm sigir conference on research and development in information retrieval in the Asia Pacific region}, pages={11--20}, year={2023} (Year: 2023).*

(Continued)

*Primary Examiner* — Lamont M Spooner
(74) *Attorney, Agent, or Firm* — Shook, Hardy & Bacon L.L.P.

(57) ABSTRACT

Various embodiments discussed herein are directed to improving existing technologies by detecting a likelihood of hallucination arising from one-shot, few-shot, or outside knowledge contexts. For example, regarding the one-shot or few-shot contexts, some embodiments determine a set of tokens in a language model output that are not found in target content but are found in at least one example. When such phrases are not very common words, this is highly indicative that the model is hallucinating because these phrases should be located in the target content but are not, but are instead located in the examples.

15 Claims, 12 Drawing Sheets

(56) References Cited

U.S. PATENT DOCUMENTS

| | | | | |
|---|---|---|---|---|
| 2016/0071022 | A1* | 3/2016 | Bruno | G06N 20/00 706/12 |
| 2020/0126116 | A1* | 4/2020 | Smith | G06Q 30/0248 |
| 2020/0364302 | A1* | 11/2020 | Hu | G06N 3/0985 |
| 2021/0192140 | A1* | 6/2021 | Galley | G06N 3/044 |
| 2022/0093094 | A1 | 3/2022 | Krishnan et al. | |
| 2022/0182253 | A1 | 6/2022 | Pawar et al. | |
| 2022/0374608 | A1* | 11/2022 | Shazeer | G06N 20/00 |
| 2022/0391591 | A1 | 12/2022 | Ronen et al. | |
| 2022/0392434 | A1* | 12/2022 | Asi | G06F 16/345 |
| 2023/0042420 | A1 | 2/2023 | Teng et al. | |
| 2023/0054068 | A1* | 2/2023 | Zheng | G06F 16/345 |
| 2023/0244938 | A1* | 8/2023 | Wei | G06N 3/045 706/25 |
| 2023/0274089 | A1* | 8/2023 | Tunstall-Pedoe | G06F 40/40 704/2 |
| 2023/0316006 | A1* | 10/2023 | Tunstall-Pedoe | G06N 3/0442 704/9 |
| 2023/0351096 | A1* | 11/2023 | Shekhar | G06N 3/0455 |
| 2023/0418848 | A1* | 12/2023 | Clinchant | G06F 40/40 |
| 2024/0202464 | A1* | 6/2024 | Poirier | G06F 16/335 |
| 2024/0242095 | A1* | 7/2024 | Bharadwaj | G06N 20/00 |
| 2024/0256589 | A1* | 8/2024 | Porwal | G06F 40/40 |
| 2024/0289395 | A1* | 8/2024 | Zhou | G06F 16/9532 |
| 2024/0289407 | A1* | 8/2024 | Rofouei | G06F 16/9577 |
| 2024/0296279 | A1* | 9/2024 | Gardner | G06F 40/169 |
| 2024/0330661 | A1* | 10/2024 | Rahman | G06N 3/044 |
| 2024/0330755 | A1* | 10/2024 | Kumar | G06N 20/00 |
| 2024/0338554 | A1* | 10/2024 | Schmidt | G06N 3/045 |
| 2024/0346232 | A1* | 10/2024 | Asi | G06F 40/30 |
| 2024/0346342 | A1* | 10/2024 | Lewis | G06N 3/044 |
| 2024/0370769 | A1* | 11/2024 | Sheth | G06N 20/00 |
| 2024/0378400 | A1* | 11/2024 | Zhang | G06N 20/00 |
| 2024/0386015 | A1* | 11/2024 | Crabtree | G06F 16/9024 |
| 2024/0386253 | A1* | 11/2024 | White, Jr. | G06F 40/166 |
| 2024/0403710 | A1* | 12/2024 | Licato | G06N 3/045 |
| 2024/0403984 | A1* | 12/2024 | Hightower | G06Q 50/184 |
| 2024/0411994 | A1* | 12/2024 | Siracusano | G06F 40/205 |
| 2024/0412058 | A1* | 12/2024 | Mayande | G06F 16/24564 |
| 2025/0005303 | A1* | 1/2025 | Gray | G06F 16/9538 |
| 2025/0068743 | A1* | 2/2025 | Rahman | G06F 11/3692 |

OTHER PUBLICATIONS

Dou, et al., "GSum: A General Framework for Guided Neural Abstractive Summarization", In Repository of arXiv:2010.08014, Oct. 15, 2020, 13 Pages.

International Search Report and Written Opinion received for PCT Application No. PCT/US2024/031335, Sep. 18, 2024, 15 pages.

Ji, et al., "Survey of Hallucination in Natural Language Generation", In Proceedings of ACM Computing Surveys, vol. 55, Issue No. 12, Mar. 2023, 38 Pages.

Luo, et al., "ChatGPT as a Factual Inconsistency Evaluator for Text Summarization", In Repository of arXiv:2303.15621, Apr. 13, 2023, 12 Pages.

"More Creative, Still Flawed": ChatGPT Creator OpenAI Announces GPT-4, Retrieved From: https://www.ndtv.com/world-news/chatgpt-more-creative-than-ever-before-openai-on-its-latest-chatgpt-4-3861729, Mar. 15, 2023, 10 Pages.

Greyling, Cobus, "Preventing LLM Hallucination With Contextual Prompt Engineering—An Example From OpenAI", Retrieved From: https://cobusgreyling.medium.com/preventing-llm-hallucination-with-contextual-prompt-engineering-an-example-from-openai-7e7d58736162, Jan. 10, 2023, 10 Pages.

International Preliminary Report on Patentability (Chapter I) received for PCT Application No. PCT/US2024/031335, mailed on Dec. 26, 2025, 12 Pages.

* cited by examiner

700

702 ᔐ MEETING TRANSCRIPT

...

Jane 04:31...go ahead and send it to me by closing... I'm sure John Doe would appreciate that...

Jack 04:44...okay will do. Also, did you tell Sam about her assignment?...

...

704

WHAT DID JANE SAY ABOUT THE FINAL SALES NUMBER FOR FEBRUARY?

706

⚠ ORIGINAL ANSWER WAS ASSOCIATED WITH A HIGH LIKELIHOOD OF HALLUCINATION. THE ANSWER BELOW REPRESENTS AN ANSWER AT AN ACCEPTABLE LEVEL OF PREDICTED HALLUCINATION.

708

JANE SAID THAT THE SALES NUMBERS FOR FEBRUARY ARE WRONG BECAUSE WE SECURED 2 ADDITIONAL LARGE ACCOUNTS ON THE LAST DAY OF THE MONTH.

710 ᔐ • LIKELIHOOD OF HALLUCINATION .005

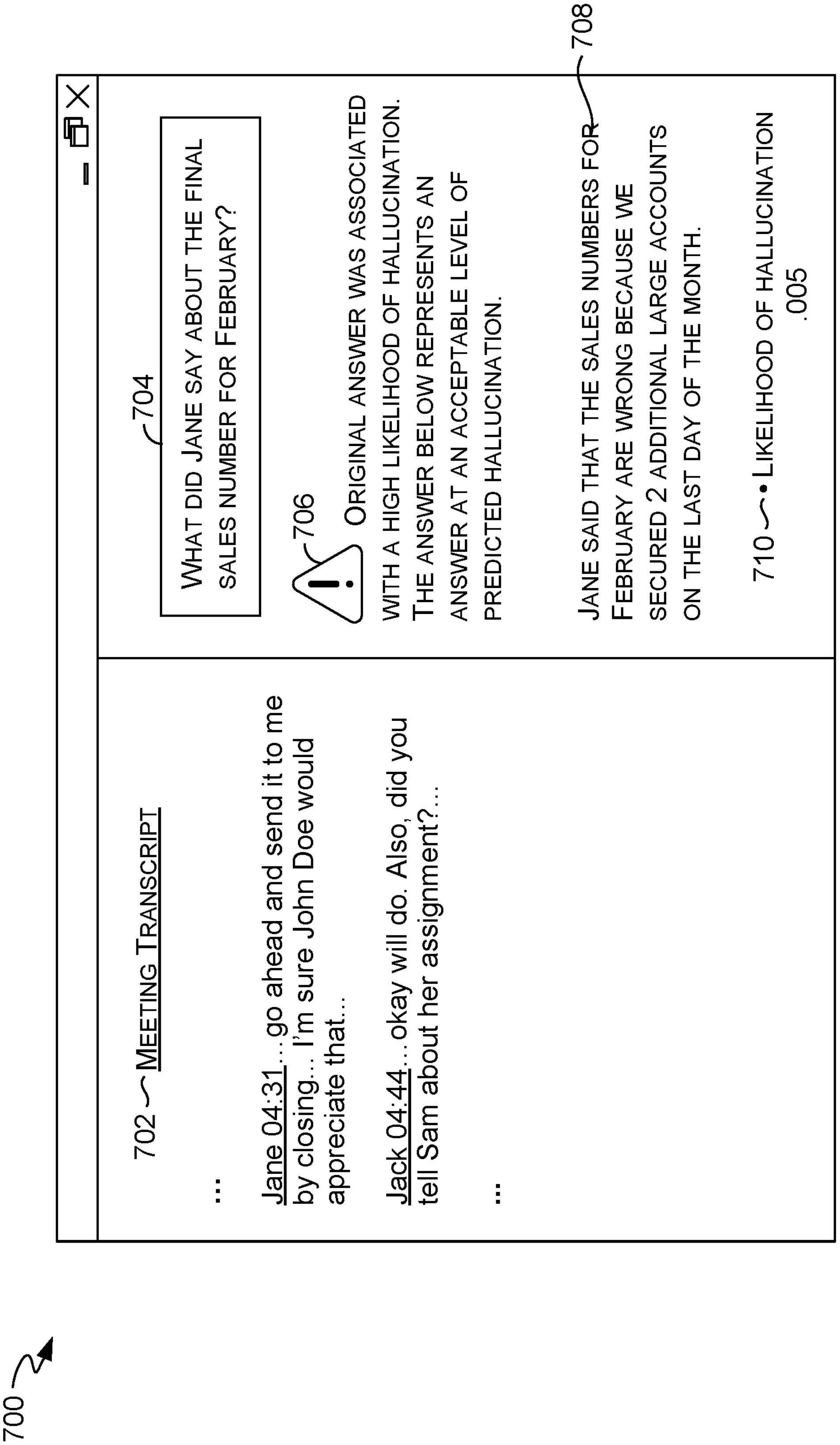

802
RECEIVE AN OUTPUT OF A LANGUAGE MODEL BASED ON THE LANGUAGE MODEL PROCESSING AN INPUT, WHEREIN THE INPUT COMPRISES: A REQUEST, TARGET CONTENT, AND ONE OR MORE EXAMPLES

804
DETERMINE A SET OF TOKENS OCCURRING IN THE OUTPUT THAT ARE NOT FOUND IN THE TARGET CONTENT, BUT ARE FOUND TO OCCUR IN AT LEAST ONE EXAMPLE, OF THE ONE OR MORE EXAMPLES

806
BASED AT LEAST IN PART ON THE DETERMINING, FOR EACH TOKEN OF THE SET OF TOKENS, DETERMINE A FREQUENCY SCORE INDICATING HOW COMMON THE TOKEN IS

808
BASED AT LEAST IN PART ON THE DETERMINING OF THE 1$^{ST}$ SCORE FOR EACH TOKEN, DETERMINE A HALLUCINATION SCORE INDICATING A LIKELIHOOD OF HALLUCINATION IN THE OUTPUT

810
BASED AT LEAST IN PART ON THE DETERMINING OF THE HALLUCINATION SCORE, CAUSE PRESENTATION, AT A USER DEVICE, OF AN INDICATOR ASSOCIATED WITH THE HALLUCINATION SCORE

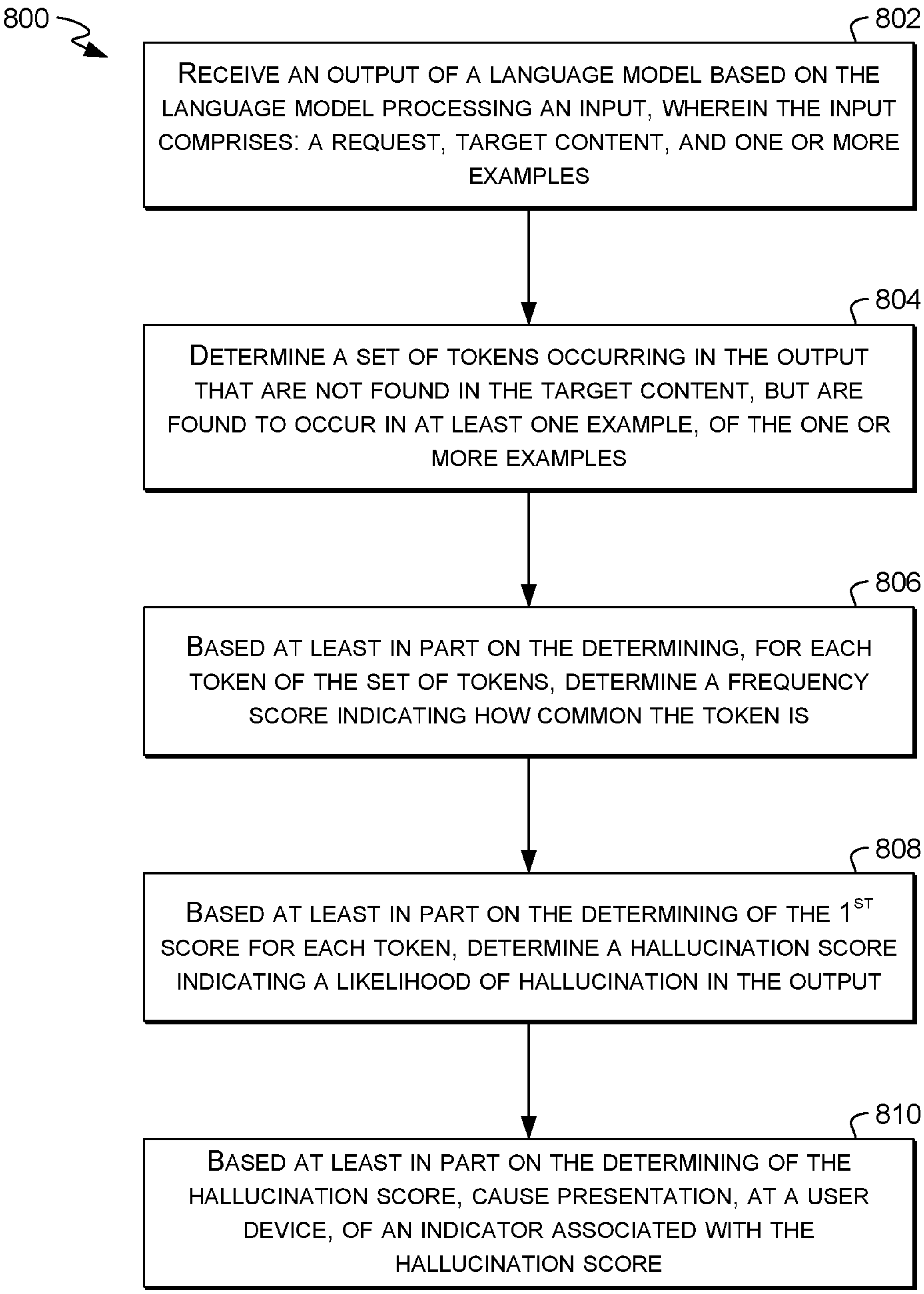

RECEIVE A 1<sup>ST</sup> OUTPUT OF A LANGUAGE MODEL BASED ON THE LANGUAGE MODEL PROCESSING A 1<sup>ST</sup> INPUT, WHEREIN THE 1<sup>ST</sup> INPUT COMPRISES: A 1<sup>ST</sup> REQUEST, TARGET CONTENT, AND EXAMPLE(S), AND WHEREIN THE 1<sup>ST</sup> OUTPUT COMPRISES A 1<sup>ST</sup> OUTPUT CONFIDENCE

905

PROVIDE A 2<sup>ND</sup> INPUT TO THE LANGUAGE MODEL, WHEREIN THE 2<sup>ND</sup> INPUT COMPRISES: THE TARGET CONTENT AND THE 1<sup>ST</sup> OUTPUT, AND WHEREIN THE 2<sup>ND</sup> INPUT EXCLUDES ANY EXAMPLES

907

RECEIVE A 2<sup>ND</sup> OUTPUT FROM THE LANGUAGE MODEL, WHEREIN THE 2<sup>ND</sup> OUTPUT COMPRISES A 2<sup>ND</sup> OUTPUT CONFIDENCE

909

COMPARE THE FIRST OUTPUT CONFIDENCE AND THE 2<sup>ND</sup> OUTPUT CONFIDENCE

911

BASED AT LEAST IN PART ON THE COMPARING, GENERATE A HALLUCINATION SCORE THAT INDICATES A LIKELIHOOD THAT HALLUCINATION EXISTS

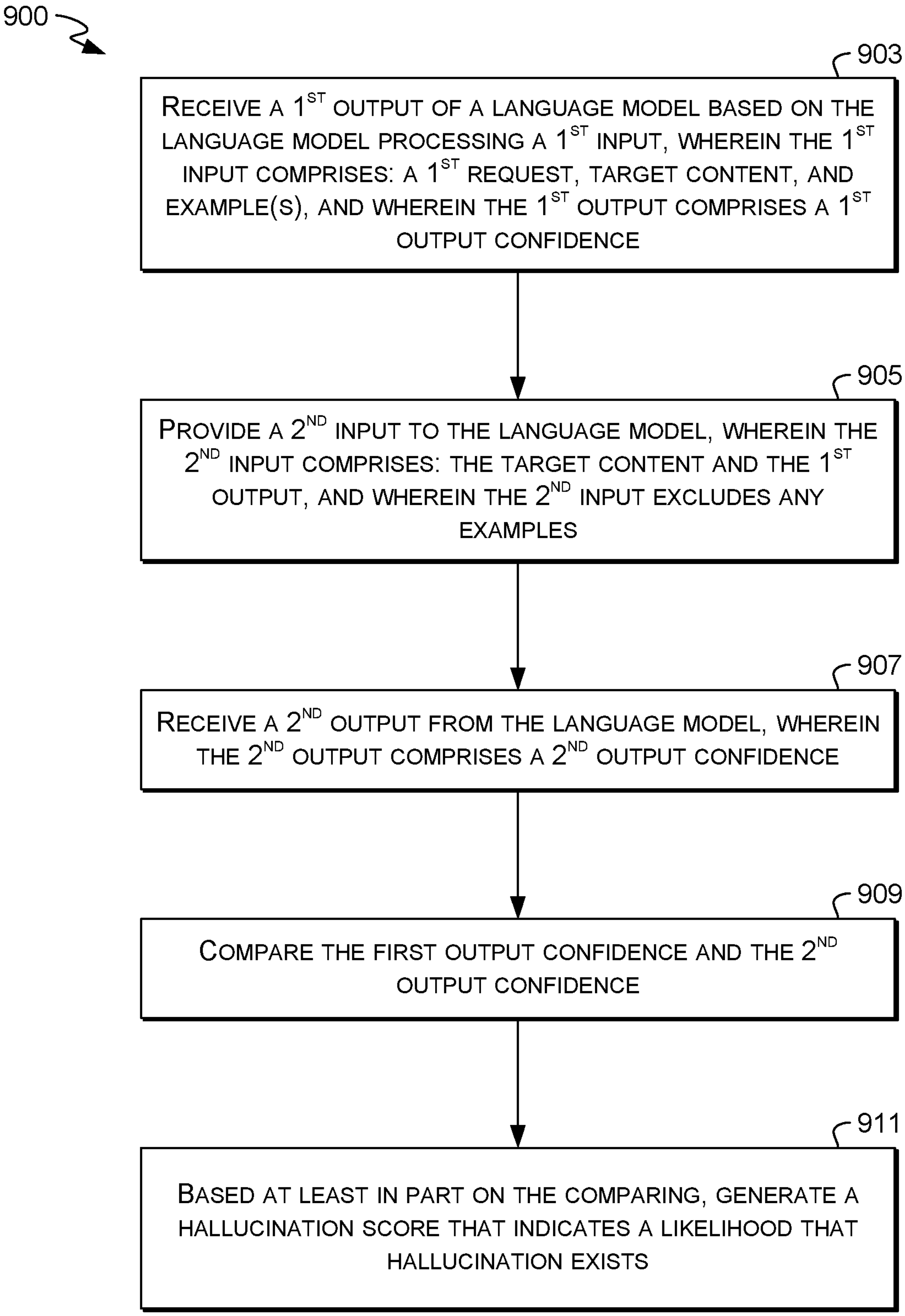

RECEIVE A 1ST OUTPUT OF A LANGUAGE MODEL BASED ON THE LANGUAGE MODEL PROCESSING A 1ST INPUT, WHEREIN THE 1ST INPUT COMPRISES A REQUEST AND TARGET CONTENT

1002

PARSE THE 1ST OUTPUT INTO SECTIONS, EACH SECTION COMPRISING A PORTION OF THE 1ST OUTPUT

1004

FOR EACH SECTION OF THE SECTIONS, GENERATE A VERACITY REQUEST

1006

PROVIDE EACH VERACITY REQUEST FOR EACH SECTION AND THE TARGET CONTENT AS 2ND INPUT TO THE LANGUAGE MODEL

1008

IN RESPONSE TO THE PROVIDING, RECEIVE A 2ND OUTPUT OF THE LANGUAGE MODULE, THE SECOND OUTPUT COMPRISES A REPLY TO THE VERACITY REQUEST AND A CORRESPONDING CONFIDENCE THAT THE REPLY CONFIRMS THE VERACITY FOR EACH SECTION

1010

BASED AT LEAST IN PART ON THE RECEIVING OF THE 2ND OUTPUT, GENERATE A HALLUCINATION SCORE THAT INDICATES WHETHER HALLUCINATION IS LIKELY IN THE FIRST OUTPUT

1012

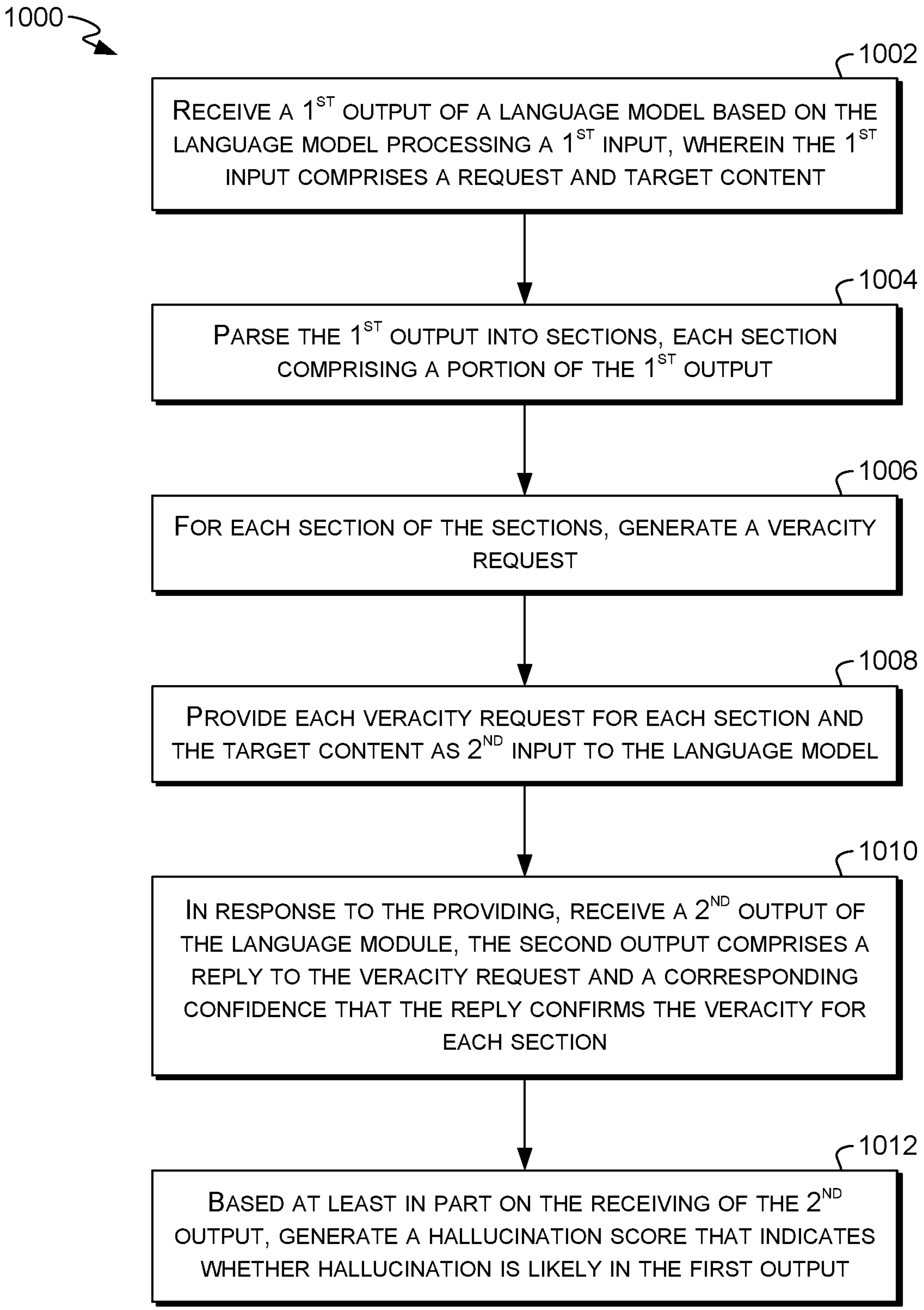

*FIG. 10.*

DETECTING HALLUCINATION IN A LANGUAGE MODEL

BACKGROUND

Computational linguistics, also known as Natural Language Processing (NLP), is a computer-based technique to understand, learn, and/or generate natural human language content. Recent advances in NLP technologies use sophisticated language models to derive a rich understanding of natural language. For example, some language models: engage in preprocessing pipelines via Part-of-Speech (POS) tagging (with tags such as noun, verb, and preposition), tokenize and parse sentences into their grammatical structures, perform lemmatization, stemming, and the like for syntactic, semantic, or sentiment analysis.

Natural Language Generation (NLG) is one of the crucial yet challenging sub-fields of NLP. NLG techniques are used by certain language models, such as large language models (LLMs) in many downstream tasks such as text summarization, dialogue generation, generative question answering (GQA), data-to-text generation, and machine translation. However, these models often generate text that is nonsensical, unfaithful to the provided source input, or is otherwise incorrect, which is referred to as "hallucination." Hallucination is concerning because it hinders model performance, such as accuracy. Language models, such as LLMs, are prone to hallucination.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to detecting the occurrence of hallucination in an output generated by a language model, such as a LLM. Hallucination occurs when the language model provides a seemingly reasonable output that is not correct, thus misleading a user. A hallucination may arise due to examples provided as part of the input prompt to the model, referred to as one-shot learning and few-shot learning. Hallucination can also arise from outside knowledge contexts. For example, hallucination can occur from one-shot or few-shot learning contexts, in which one or several examples are provided as part of the input prompt to the model along with a target content for processing by the model. In particular, the hallucination could occur where the LLM output includes a set of tokens, such as words or phrases, which are not found in the target content, but are found in at least one of the provided examples. For instance, suppose a user desires to use an LLM to generate a summary of a meeting and thus provides, as an input prompt to the LLM, a transcript of the meeting (which is one illustration of the target content described herein) and an example of a meeting summary from a different meeting, so that the LLM will generate a summary of the meeting in a format like the example. Suppose the LLM output, that is the meeting summary generated by the LLM, includes an unusual phrase such as "hazardous medical waste" that is not found in the meeting transcript but does occur in the example meeting summary. In this instance, it is likely that hallucination has occurred and the meeting, as represented by the target content, did not actually cover hazardous medical waste.

In another example, regarding general knowledge contexts, a model may hallucinate by providing an output that is wrong regardless of the example inputs. For instance, a user may provide an input prompt that is a meeting transcript and ask the model "what did John say about the status of our production?" The model might output "John said we need to increase efficiency." This output seems reasonable and a user may believe that John said this during the meeting. But suppose John was not at the meeting. The model has thus hallucinated by providing an output that did not happen.

Accordingly, some embodiments of the technology described herein detect hallucination by a language model induced by one-shot or few-shot contexts. The detection is based in part on frequency or rarity of tokens occurring in the model output. Alternatively or in addition, some embodiments detect hallucination by a language model induced by one or few shot contexts, or general knowledge contexts based on operations to determine veracity of the model output. For instance in the previous example, where the model outputted that "John said we need to increase efficiency," particular embodiments parse the model's output into one or more sections and determine a follow-up input to the model regarding a section to assess the veracity of the section. Some implementations use the follow-up input to assess the veracity of a section. For instance, continuing with the above example, one embodiment detects a hallucination based on determining a follow-up input to the model, such as an input prompting the model to answer "was John in the meeting?" Here, based on a model output indicating that John was not at the meeting, it can be inferred that the prior model output—"John said we need to increase efficiency" was a hallucination. In some embodiments, a confidence corresponding to the model's output is determined and used to infer likelihood of a hallucination. Further, confidences associated with additional outputs to follow up inputs, such as those assessing veracity, may be summed to determine composite confidence for determining likelihood of a hallucination.

The present disclosure provides one or more technical solutions that have technical effects in light of various technical problems. For example, particular embodiments have the technical effect of improved accuracy relative to existing models by implementing the technical solution of determining a hallucination score indicating a likelihood of hallucination, and/or prompt-based learning/training based on detected hallucination, which existing language models do not do. Further, particular embodiments have the technical effect of improved accuracy by modifying the generative text output itself in some way based on detected hallucination (e.g., by refraining from displaying an output where the likelihood of hallucination is high). Various embodiments also have the technical effect of increased data security or privacy based on detecting hallucination.

BRIEF DESCRIPTION OF THE DRAWINGS

The present invention is described in detail below with reference to the attached drawing figures, wherein:

FIG. 7 is a screenshot of an example user interface for presenting an output at an acceptable hallucination confidence level, according to some embodiments;

FIG. 8 is a flow diagram of an example process for detecting a likelihood of hallucination, according to some embodiments;

FIG. 9 is a flow diagram of an example process for detecting a likelihood of hallucination, according to some embodiments;

FIG. 10 is a flow diagram of an example process for detecting a likelihood of hallucination, according to some embodiments;

DETAILED DESCRIPTION

Figure 1:
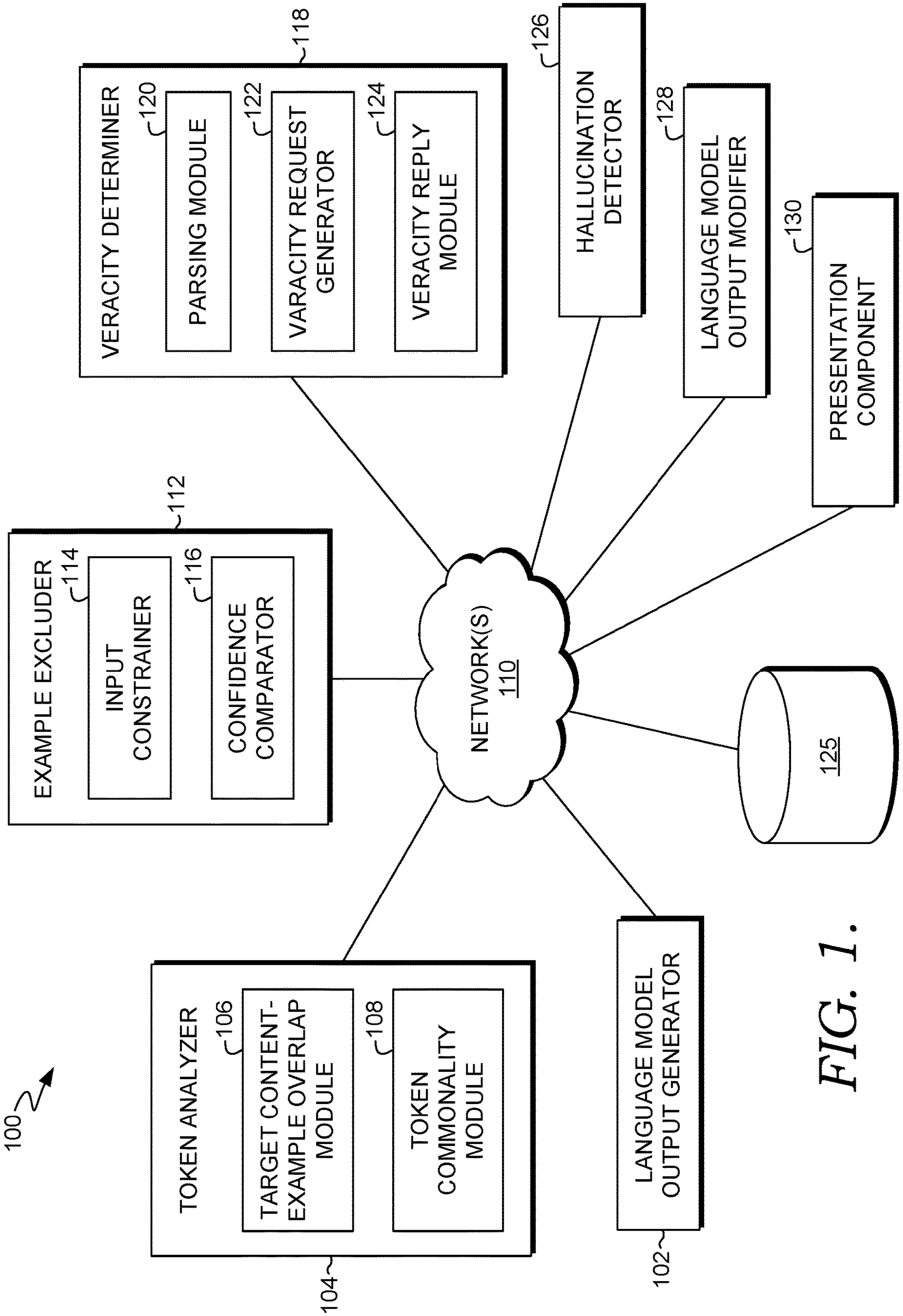
FIG. 1 is a block diagram depicting an example computing architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

Existing NLP-based technologies are incomplete or inaccurate because they are prone to certain biases, such as hallucination. Hallucination occurs when a language model provides a seemingly reasonable output that is not correct. In other words, hallucination refers to mistakes in the output, such as generated text, which is semantically or syntactically plausible (e.g., the generated text forms a correctly structured sentence) but is in fact incorrect or nonsensical, which misleads the user. For example, a user may ask a LLM about a meeting, "What did Haim say about the sales projections?" The LLM's output may be generative text that says, "Haim says the sales projections are trending down and we're going to have to fire people." However, during the meeting, Haim may not have said anything about sales projections or firing people. Therefore, the LLM has hallucinated. In yet another example, a transcript of a meeting about a company's policy of bringing pets to work may be provided as an input prompt to the LLM with a user asking the LLM for a meeting summary of the meeting. In this example, the LLM ingests the meeting summary transcript and provides a nonsensical output such as "during the meeting, Jane explained that only my pet dinosaurs would be allowed in the office . . . " However, Jane (or others at the meeting) may not have mentioned anything about dinosaurs.

One common source or cause of hallucination occurs when utilizing few-shot (or even single-shot) learning contexts, in which an example (referred to as a "shot") is provided as part of the input prompting. In particular, few-shot prompting is the concept of giving a language model two or more examples to follow for its output. These examples are provided to the language model to direct the language model on what the output should look like in terms of sentence structure (e.g., in active voice—subject, verb, object order), syntax, word choices, phrasing, user preferences, style, or the like. However, ideally the language model refrains from using substantive subject matter from examples when formulating an output. Single-shot prompting is when a language model is given a single example. For example, a task description may be, "Translate English to French," where the prompt is "cheese," and the single-shot example is "sea otter=loutre de mer." In this way, the language model uses the example to generate an output that resembles the examples. However, in many instances, the language model incorrectly uses more subject matter of the examples themselves than it should as part of the output, thereby leading to hallucination.

In another illustrative example, suppose an LLM model input prompt comprises target content that is a meeting transcript and also includes representative examples of a desired meeting summary output, such as the format and type of content to be included in the output. Suppose further that the meeting corresponding to the transcript is about debugging a software program and one of the examples is about hospital waste disposal. Upon providing the input prompt and asking the model to provide a summary of the meeting, the model provides a summary of the discussion about debugging the software, which includes a sentence about safely handling the disposal of hazardous metadata. In other words, the model incorrectly combined substantive natural language text from the example and the meeting transcript to formulate a nonsensical output—safely handling the disposal of hazardous metadata. Accordingly, the model has hallucinated. Ideally, language models should provide an output that is substantively derived mainly (or only) from the target content, but which follows the structure, style, or format of the examples provided, as opposed to words or entities in the examples (other than those words that are commonly used, such as "the" and "and" or that are also found in target content).

Another source or cause of hallucination is a language model's outside knowledge (for example, the internet), which is referred to as general knowledge hallucination. Instead of the source of hallucination being in the examples provided in a prompt, the model is hallucinating based at least in part on textual sources it has been trained on, fine-tuned on, and/or otherwise ingested (for example, content ingested in a prior prompt). For example, a user may provide an input prompt that includes a meeting transcript and ask the model, "What did Thomas Edison say during the meeting?" The model might output a hallucination that "Thomas Edison said we should increase efficiency." However, Thomas Edison was not at the meeting. Such hallucination can be based on information outside of the prompt, such as an internet article, used to train the model, where Thomas Edison talked about increasing efficiency. In this example, the source of hallucination is the model's general knowledge about Thomas Edison as derived from the article. However, the model was only supposed to use the meeting transcript (the target content) to answer the question and instead derived an answer from the article.

The present disclosure provides one or more technical solutions that have technical effects in light of these technical problems, as well as other problems, as described herein. In operation, various embodiments are directed to solving the hallucination technical problem by detecting hallucination arising from few-shot, one-shot, or outside knowledge contexts. For example, regarding the one-shot or few-shot contexts, some embodiments determine a set of tokens (e.g., words) in a language model output that are not found in target content (e.g., a meeting transcript) but are found in at least one example. For instance, a phrase such as "medical waste" may be found in one of the examples but not a meeting transcript. When such phrases are not very common words (e.g., "the," "and," "to," etc.), this is highly indicative that the model is hallucinating because these phrases should be located in the target content but are not, but are instead located in the examples.

In another example, regarding one-shot or few-shot contexts, some embodiments compare the model's confidence of a first output generated using examples and a second confidence of a second output that does not use any examples. A hallucination can be inferred based on a significant change between the confidences because large differences in confidences indicate that the examples were relied on or were important for the output content, which they should not be. For instance, at a first time, suppose a request is issued to generate a meeting summary of document D, where the input of the model includes few-shot examples. Responsively, the model generates a first output that comprises: (1) the meeting summary and (2) a first confidence that the meeting summary is correct. At a second time, suppose another request is issued to generate a meeting summary of the same document D, except at this second time no examples are provided as input to the model. The model will then generate a second output that includes a new summary and a second confidence level that this new meeting summary is correct, where the new summary and second confidence level are based on no examples being used from the input. A likelihood of hallucination then is determined if, for example, a difference between the first and second confidence levels exceeds a threshold.

In yet another example, regarding general knowledge contexts, some embodiments detect hallucination of a language model by replying to veracity requests to determine a veracity of each section of the model's output. For example, using the illustration above, a user may provide an input prompt that includes a meeting transcript and asks the model, "What did Thomas Edison say" and the model outputs that "Thomas Edison said we should increase efficiency." Particular embodiments parse the model's output into sections, asking the model different questions (e.g., via generative question answering (GQA)) to assess the veracity of the section (e.g., "was Thomas Edison in the meeting?") and receiving additional outputs having a corresponding confidence, and summing the confidence associated with these additional outputs.

Particular embodiments have the technical effect of improved accuracy relative to existing models. This is because various embodiments implement the technical solutions of determining a hallucination score indicating a likelihood of hallucination in the output and/or causing presentation, at a user device, of an indication of the hallucination. Language models that hallucinate fail to determine any likelihood of hallucination or provide the user any indication that there is hallucination in the output, which is inaccurate and the user may make incorrect decisions based on such inaccuracy. However, various embodiments detect one-shot, few-shot, and general knowledge hallucination as described herein and inform users of such detected hallucination. For example, the model output (e.g., generative text) may be supplemented with a hallucination score indicating that the likelihood of hallucination in the output is high, which gives a more accurate output result as opposed to a mere generative text output without any indication of hallucination.

Particular embodiments have the technical effect of improved accuracy by modifying the generative text output itself in some way based on detected hallucination. For example, one technical solution is causing presentation, at a user device, of an indicator indicating likelihood of hallucination without providing the output (e.g., a predicted summary). Similarly, the model output may be withheld from the user and a modified prompt (e.g., with different examples) that led to the hallucination may be repeatedly fed to the model until an output is generated that is not likely to contain a hallucination. In these situations, the presence of hallucination may initially be highly likely and so the model either refrains from surfacing or causing presentation of the output or keeps iterating until it generates an output with a low likelihood of hallucination, at which point it surfaces results to the user.

In yet another example of a technical solution, particular embodiments train or fine-tune a language model based on generating hallucination scores indicating the likelihood of hallucination. For example, generating such hallucination scores indicating a likelihood of hallucination can be a part of prompt-based learning or answer learning. Prompt-based learning (also known as "prompting") is a training method, where, in some embodiments, users directly specify the task they want completed in natural language for a pre-trained language model to interpret and complete. This is in contrast with traditional Transformer training methods where models are first pre-trained using unlabeled data and then fine-tuned, using labelled data. In some embodiments, a prompt is essentially an instruction written in natural language for the model to execute or complete. Depending on the complexity of the task being trained for, several prompts may be used. In some embodiments, "prompt engineering" refers to a process of designing or using structured input to the model (referred to as a prompt or prompts) to cause a desired response to be generated by the model. In some embodiments, prompt engineering includes creating the best or optimal prompt, or series of prompts, for the desired user task or output. Accordingly, given a first prompt (which may include target content), if the model produces a first output with a high likelihood of hallucination, particular embodiments learn (e.g., adjust neural network weights) such that a second output (indicative of low likelihood of hallucination) is always produced when such first prompt is provided as input. In this way, at model deployment time, no output is ever produced with a high likelihood of hallucination if the first prompt (or variation thereof) is provided, thereby increasing the accuracy of the model's generative outputs.

Various embodiments have the technical effect of increased data security or privacy based on detecting hallucination. Hallucination can lead to potential privacy violations. Language models can hallucinate by generating sensitive personal information (e.g., a credit card number, a phone number, an email address, and a physical address) that is inadvertently derived from a training dataset or examples. Such generation of this sensitive or personal information can be considered a type of hallucination because the model generates output text that is not "faithful" to the source input. For example, a user may issue a request to generate a summary of document D, which contains no phone numbers. However, the model may inadvertently copy a phone number from an example it used to generate the summary and inadvertently incorporate the phone number in the generated summary of document D. Such private information does not typically exist in the source input. One technical solution to increase data security or privacy is that some embodiments modify the generative text output itself in some way based on detected hallucination. For example, one technical solution is causing presentation, at a user device, of an indicator indicating likelihood of hallucination without providing the output or potential sensitive output (e.g., phone numbers). For example, the sensitive information can be deleted, masked, or otherwise obfuscated while the non-sensitive information remains. Similarly, as described above, the model output may be withheld from the user and the prompt that led to the hallucination may be repeatedly fed to the model until an output is generated that is not likely to contain sensitive information. In yet another example of a technical solution, particular embodiments train (or fine-tune) a language model based on generating hallucination scores indicating the likelihood of hallucination. For example, generating such hallucination scores indicating a likelihood of hallucination can be a part of prompt-based learning. Accordingly, given a first prompt (which may include target content), if the model produces a first output with a high likelihood of hallucination or high likelihood of sensitive data (e.g., by learning what a phone number, address, or credit card number looks like), particular embodiments learn (e.g., adjust neural network weights) such that a second output (indicative of low likelihood of hallucination) is always produced when such first prompt is provided as input. In this way, at model deployment time, no output is ever produced with a high likelihood of hallucination or sensitive information if the first prompt (or variation thereof) is provided, thereby increasing the data security of the model's generative outputs.

Turning now to FIG. 1, a block diagram is provided showing aspects of an example computing system architecture suitable for implementing some embodiments of the disclosure and designated generally as system 100. The system 100 represents only one example of a suitable computing system architecture. Other arrangements and elements can be used in addition to or instead of those shown, and some elements may be omitted altogether for the sake of clarity. Further, as with system 100, many of the elements described herein are functional entities that are implemented as discrete or distributed components or in conjunction with other components, and in any suitable combination and location according to various embodiments.

Example system 100 includes network(s) 110, which is described in connection to FIG. 11, and which communicatively couples components of system 100 including a language model output generator 102, a token analyzer 104, an example excluder 112, a veracity determiner 118, a hallucination detector, a language model output modifier 128, a presentation component 130, and storage 125. The system 100 is generally responsible for detecting hallucination in an output of a language model. In some embodiments, these components are embodied as a set of compiled computer instructions or functions, program modules, computer software services, or an arrangement of processes carried out on one or more computer systems, such as computing device 1200 described in connection to FIG. 12, and the user device 02*a* and/or the server 06 of FIG. 11 for example.

In some embodiments, the functions performed by components of system 100 are associated with one or more personal assistant applications, services, or routines. In particular, such applications, services, or routines can operate on one or more user devices (such as user device 02*a* of FIG. 11), servers (such as server 06 of FIG. 11), can be distributed across one or more user devices and servers, or be implemented in the cloud. Moreover, in some embodiments, these components of system 100 are distributed across a network, including one or more servers (such as server 06 of FIG. 11) and client devices (such as user device 02*a* of FIG. 11), in the cloud, or reside on a user device, such as user device 02*a* of FIG. 11 Moreover, these components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 100, it is contemplated that in some embodiments functionality of these components are shared or distributed across other components.

Continuing with FIG. 1, the language model output generator 102 is generally responsible for generating an output (e.g., a prediction, decision statistic, generative text, and/or a confidence score). For example, one or more of the following can be provided as output by the language model output generator 102: sentiment analysis, answering one or more questions, automatic summarization, text generation, machine translation, document classification, or any other suitable model task. Sentiment analysis is the use of NLP for analyzing digital text to determine if the emotional tone of the message is positive, negative, or neutral. Automatic summarization (or text summarization) is the process of NLP text summarization is the process of breaking down text (e.g., several paragraphs) into smaller text (e.g., one sentence or paragraph). In other words, text summarization is the process of distilling the most important information from a source (or sources) to produce an abridged version for a particular user (or users) and task (or tasks). This method extracts vital information while also preserving the meaning of the text. This reduces the time required for grasping lengthy pieces such as articles without losing vital information.

Text generation is the process of generating human natural language text with the goal of appearing indistinguishable to human-written text. In some embodiments, this is done via NSP or MLM. Typical text generation is performed in response to a user query or request, such as "write me a letter to mom," where the output is a text generation of an entire document of natural language text. Machine translation is the process of using machine learning to automatically translate text from one language to another without human involvement. Modern machine translation goes beyond simple word-to-word translation to communicate the full meaning of the original language text in the target language. It analyzes all text elements and recognizes how the words influence one another. For example, a query request may be to "translate this phrase from English to French," where the output is natural language French version of the phrase. Document classification is a process that involves assigning a document to one or more categories (e.g., novel, depending on its content.

In some embodiments, the language model output generator 102 represents or includes any suitable language model, such as a Bidirectional Encoder Representations from Transformers (BERT) model, Generative pre-trained Transformer 3 (GPT-3), or any other suitable language model, as described in more detail below.

In some embodiments, the output of the language model output generator 102 includes data other than text, such as photographs and the like. In these embodiments, a process may perform object detection or other image processing functionality to classify or otherwise identify objects in an image. Responsive to a request, for example, particular embodiments then responsively search for images relevant to the request. For instance, for queries that say, "put images of Jerry in the presentation," particular embodiments to a computer search for images where "Jerry" is the label (based on object detection or other image processing).

The token analyzer 104 is generally responsible for detecting the overlap of tokens (e.g., words) found in the output produced by the language model output generator 102, target content (e.g., a meeting transcript), and one or more examples in order for the hallucination detector 126 to detect hallucination. The token analyzer 104 is thus typically used in one-shot or few-shot contexts. Tokens are pieces of words, individual sets of letters within words, spaces between words, and/or other natural language symbols or characters (e.g., %, $, !). Before a language model processes a natural language input, the input is broken down into tokens. These tokens are not typically parsed exactly where words start or end—tokens can include trailing spaces and even sub-words. Depending on the model used, in some embodiments, models can process up to 4097 tokens shared between prompt and completion. Some models (e.g., GPT-3) takes the input converts the input into a list of tokens, processes the tokens, and converts the predicted tokens back to the words in the input.

The token analyzer 104 includes the target content—example overlap module 106 and the token commonality module 108. The target content—example overlap module 106 is generally responsible for determining a set of tokens occurring in the output of the language model output generator 102 that are not found in the target content but are found to occur in at least one example. For example, the language model output generator 102 may have taken as input, the a meeting transcript (the target content), few-shot examples in order to generate a first output, such as generative text. The target content—example overlap module 106 then determines that there are 3 specific words (e.g., "domain," "Ralph," and "the") that occur in the generative text that are also found in an example, but not found in in the meeting transcript. Any suitable algorithm can be used, such as Jaccard Index or string matching. The Jaccard similarity index compares members for multiple sets to see which members are shared and which are distinct. It's a measure of similarity for the two sets of data, with a range from 0% to 100%. The higher the percentage, the more similar the two populations. The equation is the number of word in all sets divided by the number in either set, multiplied by 100. Some embodiments alternatively or additionally use NLP or string matching algorithms to find matching strings or tokens between data sets, as well as a counter to determine the actual tokens that match, as well as the number of matches.

The token commonality module 108 is generally responsible for determining one or more frequency scores that indicate how common a token is or occurrence frequency for the token based on the functionality performed at the target content—example overlap module 106. For example, using the illustration above, for the determined overlap words of "domain," "Ralph" and "the," particular embodiments determine a frequency score for each of these tokens that represent how common or rare the corresponding word is in a given natural language. In some embodiments, a common word has a score close to zero, whereas a non-common or rare word has a score closer to 1. In some embodiments, each of the common or rare words are represented as a list, lookup, or other data structure where programmers have listed common or rare words. For example, a first data structure may represent all common natural language words (e.g., "a," "the," "and," "to," etc.). And a second data structure may represent all rare or non-common natural language words.

Alternatively or additionally, some embodiments use TF-IDF functionality to determine commonality of words. Term frequency-inverse document frequency (TF-IDF) algorithms include numerical statistics that infer how important a word or term is to a data set. In the context of this disclosure, "Term frequency" illustrates how frequently a word occurs within a data set (e.g., and example in one-shot or two-shot learning) which is then divided by the data set length (i.e., the total quantity of terms (e.g., tokens) in the data set). "Inverse document frequency" (IDF) infers how important a term is by reducing the weights of frequently used or generic terms, such as "the" and "of," which may have a high count in a data set but have little importance for relevancy of a query. For example, using the illustration above, the scores for "domain," "Ralph," and "the" may be 0.2, 0.4, and 0.9 respectively, which indicates that "Ralph" is the least common and "the" is the most common. Mathematically, IDF is represented as the log of number of documents in a corpus (e.g., an entire training data set, all examples a model uses, all target content, all requests (e.g., prompts), etc.) divided by the number of documents in the corpus that contain the word (i.e., the same word used in the TF calculations). In the TF-IDF algorithm, term frequency (TF) is multiplied by the inverse document frequency (IDF).

The hallucination detector 126 is generally responsible for determining a hallucination score that indicates a likelihood of hallucination based on the functionality of the token analyzer 104, the example excluder 112, and/or the veracity determiner 118. For example, in response to the token analyzer 104 performing its functionality, the token analyzer 104 may programmatically call the hallucination detector 26 to return its values based on the determining the frequency score indicating how common a token is. In some of these embodiments, the hallucination detector 126 sets thresholds for frequency scores for determining hallucination. For example, any score or number (e.g., float) at or below 0.4 is considered to be associated with hallucination, whereas any score above this number is not considered to be a hallucination because it is too common. Using the illustration above, given that the only two numbers (0.4 and 0.2) corresponding to the "Ralph" and "domain" words are at or below this thresholds, these are the only two words that are tagged or determined to be associated with hallucination. In some embodiments, there are multiple threshold ranges set that corresponds to "low," (0.7-1) "medium," (0.4-0.69) or "high" chance of hallucination (0.0-0.39), where the "low" "medium," and "high" indicia can be surfaced to users.

The example excluder 112 is generally responsible for comparing the model's confidences of a first output generated at 102 using examples and a second output, which does not use any examples. The hallucination detector 126 can then responsively detect hallucination based on a significant change between the confidences. The example excluder 112 includes the input constrainer 114 and the confidence comparator 116. The input constrainer 114 is generally responsible for adding and excluding different inputs to the language model output generator 102 to derive an additional output. Specifically, the input constrainer 114 adds, as an input, a first output generated by the language model output generator 102, keeps the same target content as an input, and then excludes providing any examples as an input to the language model output generator 102. For example, a first output by the language model output generator 102 may be a first generative text, as well as a first confidence indicating the likelihood or confidence that the output is correct. Such output may be based on a first example of generative text. The input constrainer 114 thus provides such first generative text (e.g., and its confidence) as an input to the model at a second time, except that the input at the second time does not include the first example.

The confidence comparator 116 is generally responsible for comparing the first output confidence (where examples were used) with a second output confidence (where examples were not used) based on the inputs provided to the model by the input constrainer 114. In other words, the confidence comparator 116 computes a difference between the confidence values and then programmatically passes or returns the value that indicates the difference to the hallucination detector 125 to determine hallucination. For example, the first output may contain generative text, without a confidence value of 0.5 indicating that the model is 50% sure that the generative text contains the correct output. The second output may only be a second confidence value 0.0001 (and not include any generative text), indicating that the model is only less than 1% confident that the model is producing the correct output. The confidence comparator 116 then subtracts 0.0001 from 0.5 to determine the difference −0.4999. This value, 0.4999, is then passed to the hallucination detector 126. In some of these embodiments, the hallucination detector 126 programmatically sets one or more confidence difference thresholds that indicates different levels of likely hallucination. Larger differences between confidences typically indicate that the model relied heavily on the examples for the output since the examples were excluded by the input constrainer 114. Conversely, smaller differences between confidences typically indicate that the model did not rely on the examples for the output because the confidences were comparable. For example, some embodiments infer hallucination based on the differences between confidences being greater than 0.2 (i.e., a threshold). In this example, the difference value 0.4999 is indicative of hallucination because it is larger than the 0.2 threshold.

The veracity determiner 118 is generally responsible for replying to veracity requests to determine a veracity of each section of the language output generator 102's output. The veracity determiner 118 includes a parsing module 120, a veracity request generator 122, and a veracity reply module 124. The parsing module 120 is generally responsible for parsing a first output produced by the language model output generator 102 into sections (e.g., chunks, units, etc.). In some embodiments, where parsing begins or ends for a section is based on how many words or tokens are in the model output. For example, using NLP (e.g., syntactic analysis, POS tagging, etc.), particular embodiments can break a generative text output into individual sentences, words, or paragraphs based on the size of the output. For example, the larger the output, the more tokens or words there will be in each section, whereas the smaller the output, the less tokens or words will be in each section. In an illustrative example, if a generative output summarization only contains 3 sentences, then some embodiments parse the output summarization by extracting and analyzing each sentence (e.g., by storing, in memory, each sentence in a separate data structure or memory location) such that the parsed output contains three sections corresponding to 3 sentences. In another example, if a generative output only contains 1 sentence, then particular embodiments parse the sentence into each word or group of words such that each section corresponds to a single word in the sentence. In yet another example, if the generative output is two pages, then particular embodiments parse the two pages into individual paragraphs such that each section corresponds to each paragraph.

The veracity request generator 122 is generally responsible for generating a veracity request for each section parsed by the parsing module 120, where the veracity request is indicative of a request to determine a veracity of the section. In some embodiments, the generating of the veracity request is based on matching words in each parsed section of the output to those in the target content. A higher match between words is indicative of a lower likelihood of hallucination, whereas a lower match between words is indicative of a higher likelihood of hallucination. For example, a first section may include the words, "Thomas Edison." The model then determines that this string has a match in the target content. This individual match indicates a lower likelihood of hallucination because words in the target content are being used to formulate the output.

In some embodiments, the request generator 122 represents or uses another language model (e.g., relative to the language model output generator 102) to generate these veracity requests by generating natural language questions for the model to answer. For example, if a first section of an LLM output is "Thomas Edison said we need to increase efficiency," then the veracity request generator 122 may perform generative question answering (GQA) by generating a question that says, "Did Thomas Edison attend the meeting," "Did Thomas Edison talk about efficiency," etc. In some of these embodiments, the veracity request generator 122 learns these questions (and/or the reply via the veracity reply module 124) by fine-tuning on a variety of QA data sets by converting different QA formats into a unified sequence-to-sequence format. For example, some embodiments perform the QA task by adding a new question-answering head on top of a model (e.g., BERT), just the way a masked language model head is added (in pre-training) for performing a MLM task, except that the task is a part of fine-tuning, as described in more detail below.

In some embodiments, this functionality of the veracity request generator 122 alternatively or additionally includes using other NLP-based functionality, such as Named Entity Recognition (NER) in order to determine what the entities are in an output and target context, which frames or directs the model on how to ask the veracity request/question. NER is an information extraction technique that identifies and classifies tokens/words or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location," time, price (or other invoice data) and the like.

In an illustrative example of NER functionality, if NER tags an entity (e.g., Thomas Edison) as a "name entity," this triggers a certain phrase in the question, such as "did Thomas Edison . . . " In some embodiments, the rest of the question depends on tokens found in the input prompt, request, the target content, and/or the output. For example, if the user asked, "What did Thomas Edison say in the meeting transcript?" and the target content includes a title, "X meeting," the model may ask, "Did Thomas Edison attend the meeting?" In some embodiments, the veracity request generator 122 generates such veracity requests via prompt learning, as described above, where the prompts are questions, in order to map particular questions to particular answers.

The veracity reply module 124 is generally responsible for generating a reply to the veracity request and a corresponding confidence score that the reply is yes, no, or otherwise indicates the veracity. For example, if GQA or QA functionality is used by the veracity request generator 122 to generate a question, such reply corresponds to the answer to the question. In embodiments, such answer is based on fine-tuning a model (e.g., BERT), NER, and the other functionality described above. In some embodiments, the reply corresponds to an overlap (e.g., Jaccard Index) score between matching words. As described above, for example, a higher match between words is indicative of a lower likelihood of hallucination, whereas a lower match between words is indicative of a higher likelihood of hallucination. Accordingly, a score (i.e., the reply) may be provided that indicates the level of matching words, such as a score that indicates whether the words "Thomas Edison" found in the target content.

In some embodiments, the veracity reply module 124 responsively passes its output to the hallucination detector 126 so that the hallucination detector 126 can generate a score indictor whether hallucination is likely based on the reply to the veracity request. For example, if the reply or answer is "yes" or other value indicating yes (e.g., a 1 or 0), then the hallucination detector 126 determines that hallucination is unlikely, whereas if the reply or answer is "no"), then the hallucination detector 126 determines that hallucination is likely.

The language model output modifier 128 is generally responsible for modifying the output of the language model output generator 102 in one or more manners. For example, in some embodiments, the language model output modifier 128 masks, hides, or refrains from passing the output produced by the language model output generator 102 to the presentation component 130 when the likelihood of hallucination is above a threshold (e.g., 50% likely). In these embodiments, the output is not presented or displayed to a user device of a user. Alternatively or additionally, the language model output modifier 128 generates a new output based on the likelihood of hallucination being over a threshold. For example, if the likelihood of hallucination is over a threshold, particular embodiments generate a new output without using any one-shot or few-shot examples. Alternatively or additionally, if the likelihood of hallucination is over a threshold, particular embodiments generate a new output without using only those tokens/words that occur in the output that are not found in the target content, but are found to occur in one or more examples, as determined by the target content example overlap module 106. In another example, the language model output modifier 128 passes those words in the output that are indicative of hallucination to the presentation component 130 such that the presentation component highlights, via a particular pixel or color value, such received words so that the user can see what words correspond to hallucination.

In yet another example of the language model output modifier 128, in some embodiments, the language model output modifier 128 masks, encrypts, obfuscates, or otherwise makes unavailable, sensitive information contained in the output. For example, a machine learning model or programming rules can be used to determine the format of specific sensitive information and mask such information if it is presented in the output via the presentation component 130. For example, programming logic may state, that if a string in the output contains 2 dashes separated by a sequence of 3 numbers, then 2 numbers, then 4 numbers, this is highly indicative of a social security number, which is sensitive. Accordingly, particular embodiments obfuscate the social security number.

Example system 100 also includes a presentation component 130 that is generally responsible for causing presentation of content and related information to a user, such as web or app pages and their sitemap elements. For example, in some embodiments, the presentation component 130 causes presentation of an indicator on whether an output (or portion of the output) contains hallucination (e.g., "high chance of hallucination") and/or the exact confidence value (e.g., 0.90) that indicates the likelihood of hallucination. In some embodiments, the presentation component 130 comprises one or more applications or services on a user device, across multiple user devices, or in the cloud. For example, in one embodiment, presentation component 130 manages the presentation of content to a user across multiple user devices associated with that user. Based on content logic, device features, associated logical hubs, inferred logical location of the user, and/or other user data, presentation component 130 may determine on which user device(s) content is presented, as well as the context of the presentation, such as how (or in what format and how much content, which can be dependent on the user device or context) it is presented and/or when it is presented. In particular, in some embodiments, presentation component 130 applies content logic to device features, associated logical hubs, inferred logical locations, or sensed user data to determine aspects of content presentation.

In some embodiments, presentation component 120 generates user interface features (or causes generation of such features) associated with pages. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 130 determines when and how to present the content. In such embodiments, the content, including content logic, may be understood as a recommendation to the presentation component 130 (and/or personal assistant service or application) for when and how to present the notification, which may be overridden by the personal assistant app or presentation component 130.

Example system 100 also includes storage 125. Storage 125 generally stores information including data, computer instructions (for example, software program instructions, routines, or services), data structures, and/or models used in embodiments of the technologies described herein. In some embodiments, storage 125 represents any suitable data repository or device, such as a database, a data warehouse, RAM, cache, disk, RAID, and/or a storage network (e.g., Storage Area Network (SAN)). In some embodiments, storage 125 includes data records (e.g., database rows) that contain any suitable information described herein. In some embodiments, each record is called or requested and returned, over the computer network(s) 110, depending on the component needing it, as described herein.

By way of example and not limitation, data included in storage 125, may generally be referred to throughout as data. Any such data, in some embodiments, is sensed or determined from a sensor (referred to herein as sensor data), such as location information of mobile device(s), smartphone data (such as phone state, charging data, date/time, or other information derived from a smartphone), computer user-activity information (for example: app usage; online activity; searches; voice data such as automatic speech recognition; activity logs; communications data including calls, texts, instant messages, and emails; website posts; other records associated with events; or other activity related information) including computer user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor, data derived based on other data (for example, location data that can be derived from Wi-Fi, Cellular network, or IP address data), and nearly any other source of data that may be sensed or determined as described herein.

Figure 2:
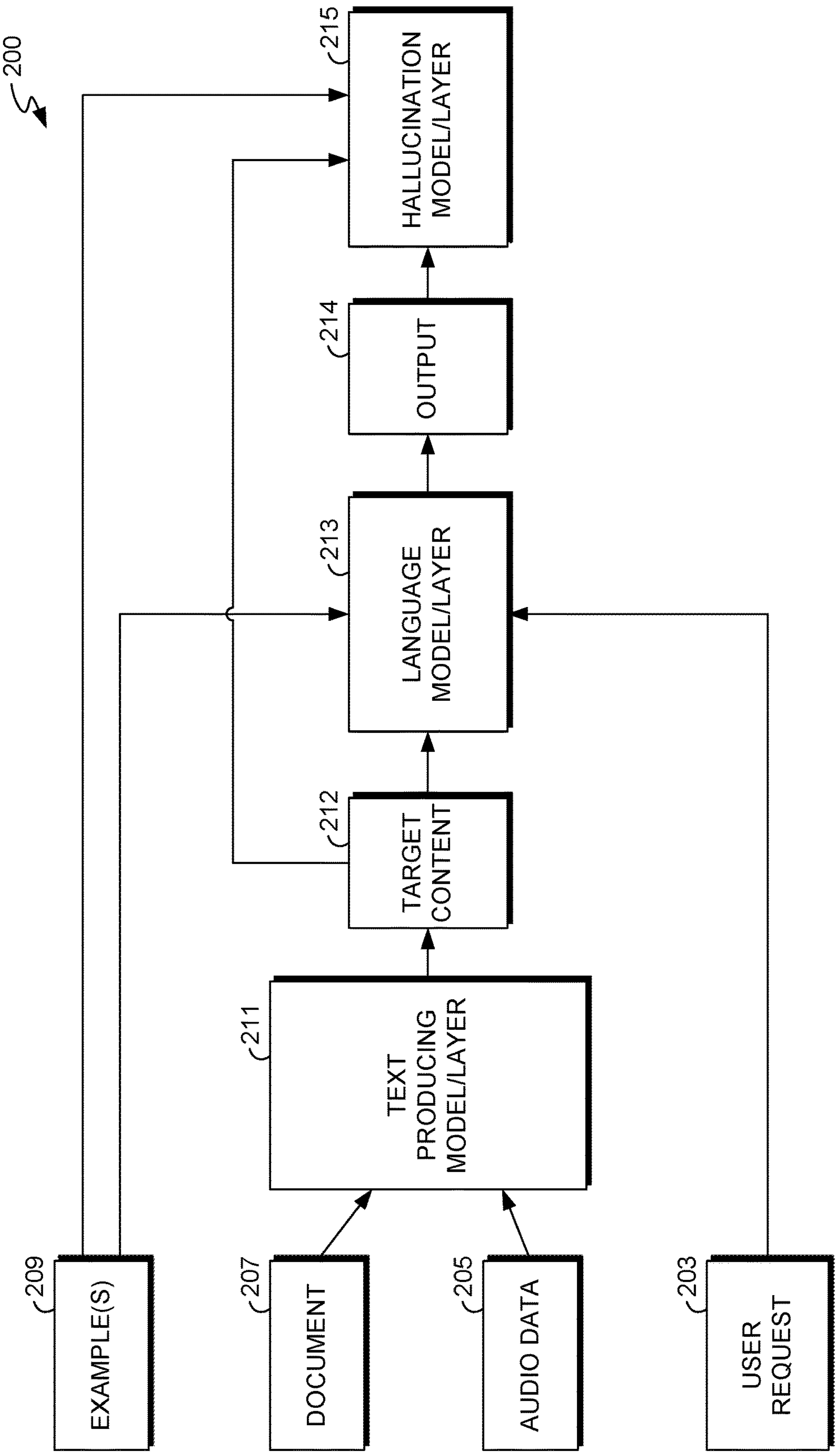
FIG. 2 is a schematic diagram illustrating different models or layers, each of their inputs, and each of their outputs to detect hallucination, according to some embodiments.

FIG. 2 is a schematic diagram illustrating different models or layers, each of their inputs, and each of their outputs to detect hallucination, according to some embodiments. A "model/layer" as illustrated in FIG. 2 represents a respective machine learning model (e.g., of an ensemble of models), or a different layer within a single machine learning model, such as an input layer, hidden layers, or and output layer of a neural network. At a first time, the text producing model/layer 211 receives a document 207 and/or the audio data 205. In some embodiments, the document 207 is a raw document or data object, such as an image of a tangible paper or particular file with a particular extension (for example, PNG, JPEG, GIFF). In some embodiments, the document is any suitable data object, such as a web page (such as a chat page), an app activity, or the like. The audio data 205 may be any data that represents sound, where the sound waves from one or more audio signals have been encoded into other forms, such as digital sound or audio. The resulting form can be recorded via any suitable extensions, such as WAV, Audio Interchange File Format (AIFF), MP3, and the like. The audio data may include natural language utterances, as described herein.

At a second time subsequent to the first time, the text producing model/layer 211 converts or encodes the document 207 into a machine-readable document and/or converts or encodes the audio data into the target content 212. For example, in some embodiments, the text producing model/layer 211 performs OCR on the document 207 (an image) in order to produce a machine-readable document. Alternatively or additionally, the text producing model/layer 211 performs speech-to-text functionality to convert the audio data 305 into a transcription document (e.g., a meeting transcript) and performs NLP.

At a third time, subsequent to the second time, the language model/layer 213 receives, as input: the target content 212 produced by the text producing model/layer 211 (for example, a speech-to-text document), one or more examples 209 (e.g., few-shot prompting examples), and/or a user request 203 (e.g., a task request, or prompt, such as "translate to English") in order to generate the output 214 (e.g., text summarization). In some embodiments, the language model/layer 213 represents or includes the functionality of the language model output generator 102, as described FIG. 1. In an illustrative example of the language model/layer 213, the user request 203 may be "What did Jack Say about the project in the meeting" where the target content 212 includes a meeting transcript of the meeting, and the one or more examples 209 include other examples of responses where a meeting transcript was a target content in order to perform the output 214, which is a generative answer that says, "Jack said that the project should be delayed one week."

At a fourth time subsequent to the third time, the hallucination model/layer 215 takes, as input, the target content 212, the output 214, and/or the one or more examples 209 in order to generate, at the final output, a hallucination score indicative of a predicted likelihood of hallucination. In some embodiments, the hallucination model/layer 215 represents or includes the functionality as described with respect to the token analyzer 104 and the hallucination detector 126 of FIG. 1 in order to detect hallucination based on determining token overlap between the output 214, the target content 212, and the one or more examples 209. Using the illustration above, for example, for the output 214 of "Jack said that the project should be delayed one week," the hallucination model/layer 215 may determine that there are two tokens, "delayed" and "week" (or semantic equivalents "withheld" (semantically equivalent to "delayed" or "7 days" (semantically equivalent to "week")) that occur or are found in the output 214 that are not found in the target content but are found in one of the examples 209. Based on such finding, given that "delayed" and "week" are uncommon words and the output is short in token/size length, the hallucination model/layer 215 generates a hallucination score indicating a high likelihood of hallucination.

Figure 3:
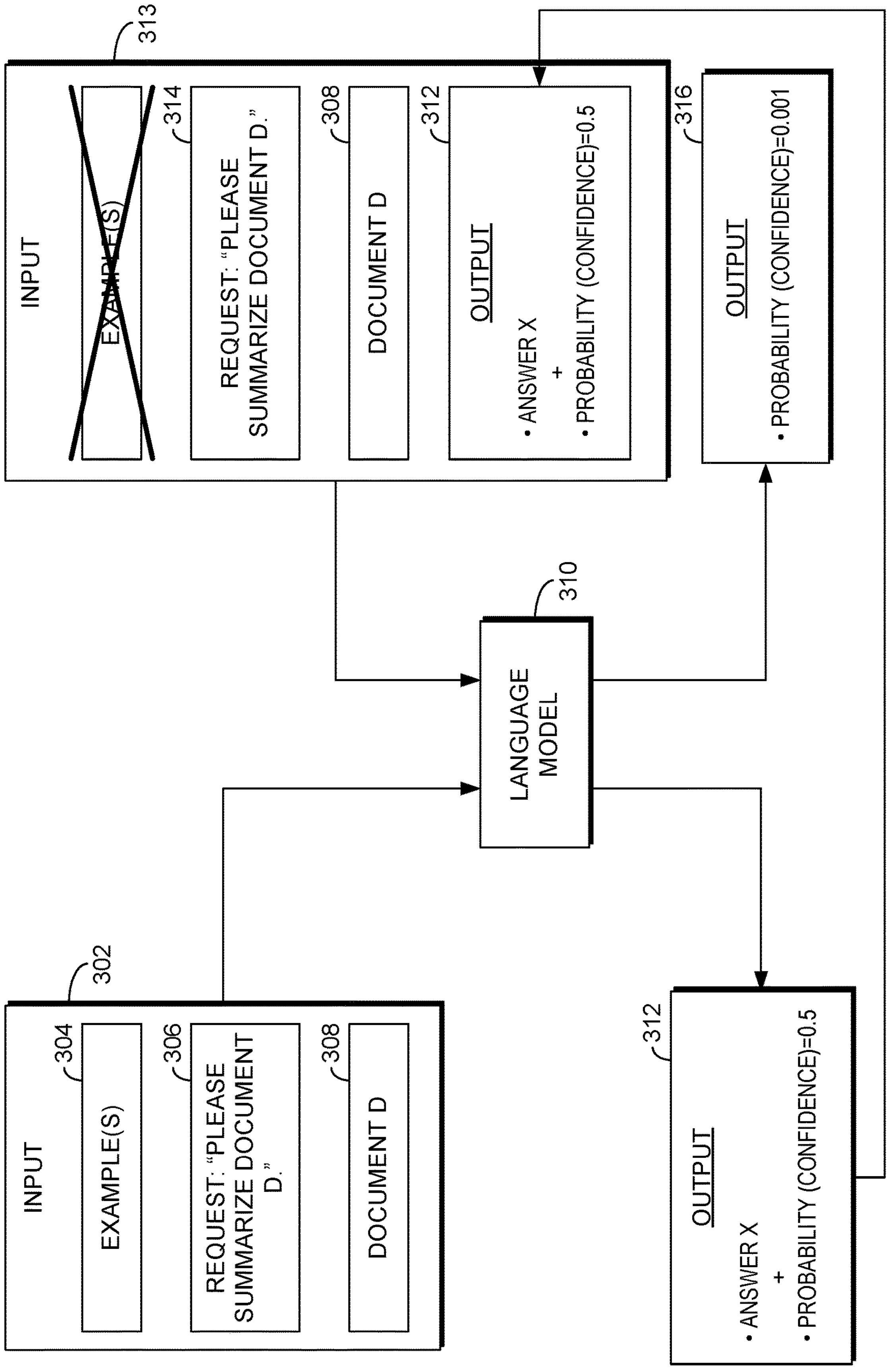
FIG. 3 is a block diagram illustrating how hallucination is detected via a model that provides different outputs given different inputs, according to some embodiments.

FIG. 3 is a block diagram illustrating how hallucination is detected via a model that provides different outputs given different inputs, according to some embodiments. In some embodiments, the functionality of the FIG. 3 represents the functionality performed by the example excluder 112 and the language model output generator 102 of FIG. 1.

At a first time, the language model 310 (e.g., the language model output generator 102) receives or processes the input 302 in order to produce or generate the output 312. Specifically, the input 301 includes one or more examples 302 (e.g., the one or more examples 209), a request 306 (i.e., "Please summarize document D,") and document D 308 (the target content). Accordingly, based on the input 302, the language model 310 generates the output 312, which includes answer X (e.g., "the document D contains sales information for business unit Y and the month of January"), as well as a probability or confidence level of 0.5, which indicates the language model 310's confidence level that the answer X is the correct answer.

At a second time subsequent to the first time, the language model 310 processes a different input 310 (e.g., as produced by the input constrainer 114 of FIG. 1) in order to produce or generate a second output 316. Specifically, after the output 312 has been generated, particular embodiments then automatically provide the output 312 as a part of the input 313. As illustrated in the input 313, no examples are used as part of the input 313. The request 314 is also provided as part of the input 313. As illustrated in FIG. 3, the request 314 is the same request in substance than the request 306, except that it is issued again at the second time. The same document D 308 is also provided in the input 313.

The output 316 only contains a probability or confidence level 0.0001, which indicates the language model 310's confidence level that answer X is the correct answer given the input 313 (or given that no examples were used in the input 313). In these embodiments, no answer or generative text is necessarily provided or displayed in the output 316. Rather, particular embodiments only generate a confidence score (0.0001), which is different than the confidence level 0.5 in the output 312, at least partially due to the different inputs used and potential hallucination, as described in more detail below. Alternatively, in some embodiments, the language model 310 additionally generates another answer Y in the output 316 based on processing the input 313. For example, the answer Y may be "the document D contains discussion of software products for business unit Y" which is different than the answer X. Accordingly, in these embodiments, the probability or confidence level 0.0001 indicates the language model 310's confidence level that the new answer Y is the correct answer given the input 313 (or given that no examples were used in the input 313).

In some embodiments, in response to the language model 310 producing the output 316 (and/or answer Y), the confidence comparator 116 and hallucination detector 126 perform their functionality, as described with respect to FIG. 1. For example, some embodiments then compare the confidence score 0.5, as illustrated in the output 312 with the confidence score 0.0001, as illustrated in the output 316. Such large difference in confidence levels exceeds a hallucination threshold in some embodiments, which indicates that there is likely hallucination in the language model 310 (or more specifically in the output 312). Such large difference in confidences indicates that the language model 310 is likely heavily relying on the example(s) 304 for its predictions/output, which it should not be—it should only be using the example(s) 304 as a guide for format, style, etc. for its output. Accordingly, such large difference in confidences indicates likely hallucination.

Figure 4:
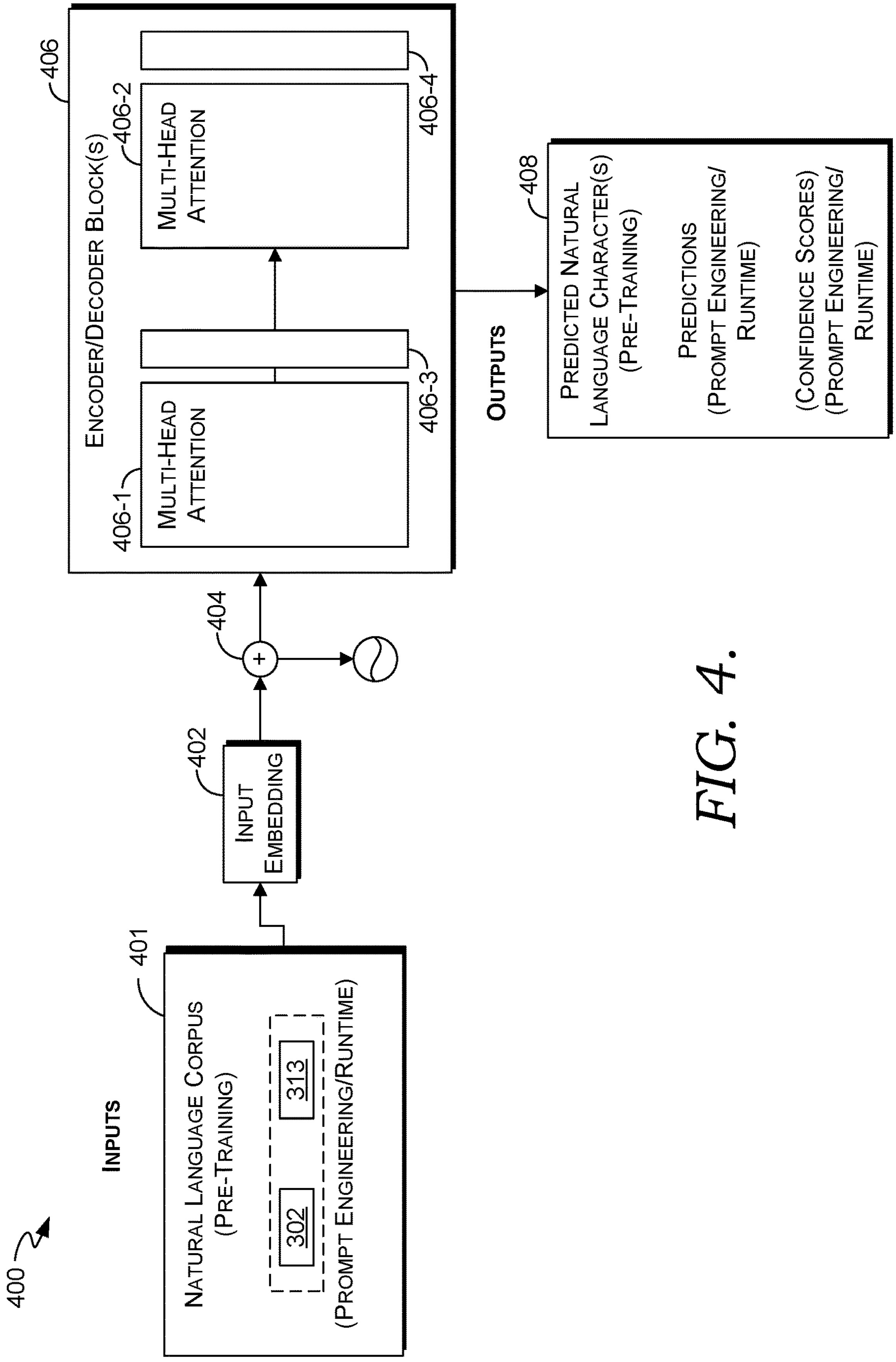
FIG. 4 is a block diagram of a language model that uses particular inputs to make particular predictions, according to some embodiments.

FIG. 4 is a block diagram of a language model 400 (e.g., a BERT model or GPT-4 model) that uses particular inputs to make particular predictions (e.g., answers to questions), according to some embodiments. In some embodiments, this model 400 represents or includes the functionality as described with respect to the language model output generator 102 of FIG. 1, the language model/layer 213 of FIG. 2, and/or the language model 310 of FIG. 310. In various embodiments, the language model 400 includes one or more encoders and/or decoder blocks 406 (or any transformer or portion thereof).

First, a natural language corpus (e.g., various WIKIPEDIA English words or BooksCorpus) of the inputs 301 are converted into tokens and then feature vectors and embedded into an input embedding 402 to derive meaning of individual natural language words (for example, English semantics) during pre-training. In some embodiments, to understand English language, corpus documents, such as text books, periodicals, blogs, social media feeds, and the like are ingested by the language model 400.

In some embodiments, each word or character in the input(s) 401 is mapped into the input embedding 402 in parallel or at the same time, unlike existing long short-term memory (LSTM) models, for example. The input embedding 402 maps a word to a feature vector representing the word. But the same word (for example, "apple") in different sentences may have different meanings (for example, phone v. fruit). This is why a positional encoder 404 can be implemented. A positional encoder 404 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin\left(pos/10000^{2i/d_{model}}\right)$$

$$PE_{(pos,2i+1)} = \cos\left(pos/10000^{2i/d_{model}}\right)$$

After passing the input(s) 401 through the input embedding 402 and applying the positional encoder 404, the output is a word embedding feature vector, which encodes positional information or context based on the positional encoder 404. These word embedding feature vectors are then passed to the encoder and/or decoder block(s) 406, where it goes through a multi-head attention layer 406-1 and a feedforward layer 406-2. The multi-head attention layer 406-1 is generally responsible for focusing or processing certain parts of the feature vectors representing specific portions of the input(s) 401 by generating attention vectors. For example, in Question Answering systems, the multi-head attention layer 406-1 determines how relevant the $i^{th}$ word (or particular word in a sentence) is for answering the question or relevant to other words in the same or other blocks, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \text{softmax}\left(\frac{Q \cdot K^T}{\sqrt{\text{Dimension of vector } Q, K \text{ or } V}}\right) \cdot V$$

For multi-headed attention, there a multiple weight matrices $W^q$, $W^k$ and $W^v$ so there are multiple attention vectors Z for every word. However, a neural network may only expect one attention vector per word. Accordingly, another weighted matrix, $W^z$, is used to make sure the output is still an attention vector per word. In some embodiments, after the layers 406-1 and 406-2, there is some form of normalization (for example, batch normalization and/or layer normalization) performed to smoothen out the loss surface making it easier to optimize while using larger learning rates.

Layers 406-3 and 406-4 represent residual connection and/or normalization layers where normalization re-centers and re-scales or normalizes the data across the feature dimensions. The feedforward layer 406-2 is a feed forward neural network that is applied to every one of the attention vectors outputted by the multi-head attention layer 406-1. The feedforward layer 406-2 transforms the attention vectors into a form that can be processed by the next encoder block or making a prediction at 408. For example, given that a document includes first natural language sequence "the due date is . . . " the encoder/decoder block(s) 406 predicts that the next natural language sequence will be a specific date or particular words based on past documents that include language identical or similar to the first natural language sequence.

In some embodiments, the encoder/decoder block(s) 406 includes pre-training to learn language (pre-training) and make corresponding predictions. In some embodiments, there is no fine-tuning because some embodiments perform prompt engineering or learning. Pre-training is performed to understand language and fine-tuning is performed to learn a specific task, such as learning an answer to a set of questions (in Question Answering systems).

In some embodiments, the encoder/decoder block(s) 406 learns what language and context for a word is in pre-training by training on two unsupervised tasks (MLM and NSP) simultaneously or at the same time. In terms of the inputs and outputs, at pre-training, the natural language corpus of the inputs 401 may be various historical documents, such as text books, journals, periodicals in order to output the predicted natural language characters in 408 (not make the predictions at runtime or prompt engineering at this point). The encoder/decoder block(s) 406 takes in a sentence, paragraph, or sequence (for example, included in the input(s) 401), with random words being replaced with masks. The goal is to output the value or meaning of the masked tokens. For example, if a line reads, "please [MASK] this document promptly," the prediction for the "mask" value is "send." This helps the encoder/decoder block(s) 406 understand the bidirectional context in a sentence, paragraph, or line at a document. In the case of NSP, the encoder/decoder block(s) 406 takes, as input, two or more elements, such as sentences, lines, or paragraphs and determines, for example, if a second sentence in a document actually follows (for example, is directly below) a first sentence in the document. This helps the encoder/decoder block(s) 406 understand the context across all the elements of a document, not just within a single element. Using both of these together, the encoder/decoder block(s) 406 derives a good understanding of natural language.

In some embodiments, during pre-training, the input to the encoder/decoder block(s) 406 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 402). At the output side is the binary output for the next sentence prediction. For example, this component may output 1, for example, if masked sentence 2 followed (for example, was directly beneath) masked sentence 1. The output is word feature vectors that correspond to the outputs for the machine learning model functionality. Thus, the number of word feature vectors that are input is the same number of word feature vectors that are output.

In some embodiments, the initial embedding (for example, the input embedding 402) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 401) that is encoded into a vector (for example, first sentence, second sentence, etc. assuming a top-down and right-to-left approach). The position embeddings are vectors that represent the position of a particular word in such sentence that can be produced by positional encoder 404. When these three embeddings are added or concatenated together, an embedding vector is generated that is used as input into the encoder/decoder block(s) 406. The segment and position embeddings are used for temporal ordering since all of the vectors are fed into the encoder/decoder block(s) 406 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, once pre-training is performed, the encoder/decoder block(s) 406 performs prompt engineering or fine-tuning on a variety of QA data sets by converting different QA formats into a unified sequence-to-sequence format. For example, some embodiments perform the QA task by adding a new question-answering head or encoder/decoder block, just the way a masked language model head is added (in pre-training) for performing a MLM task, except that the task is a part of prompt engineering or fine-tuning. This includes the encoder/decoder block(s) 406 processing the inputs 302 and/or 313 (i.e., the inputs 302 and 313 of FIG. 3) in order to make the predictions and confidence scores as indicated in 404. Prompt engineering, in some embodiments, is the process of crafting and optimizing text prompts for language models to achieve desired outputs. In other words, prompt engineering comprises a process of mapping prompts (e.g., a question) to the output (e.g., an answer) that it belongs to for training. For example, if a user asks a model to generate a poem about a person fishing on a lake, the expectation is it will generate a different poem each time. Users may then label the output or answers from best to worst. Such labels are an input to the model to make sure the model is giving a more human-like or best answers, while trying to minimize the worst answers (e.g., via reinforcement learning). In some embodiments, a "prompt" as described herein includes one or more of: a request (e.g., a question or instruction (e.g., write a poem)), target content, and one or more examples, as described herein.

In some embodiments, the inputs 401 additionally or alternatively include other inputs, such as the inputs described in FIG. 2 (i.e., the target content 212, the output 214, the example(s) 209, and/or the user request 203), and/or veracity requests. In an illustrative example, in some embodiments, the predictions of the output 406 represent the answer X in the output 312, an answer Y in the output 316, and/or the output 214 of FIG. 2. For instance, the predictions may be generative text, such as a generative answer to a question, machine translation text, or other generative text. Alternative to prompt engineering, in some embodiments the inputs 302, 313 (or FIG. 2 inputs; or veracity requests) represent inputs provided to the encoder/decoder block(s) 408 at runtime or after the model 400 has been trained, tested, and deployed. Likewise, in these embodiments, the predictions in the output 408 represent predictions made at runtime or after the model 400 has been trained, tested, and deployed.

Figure 5:
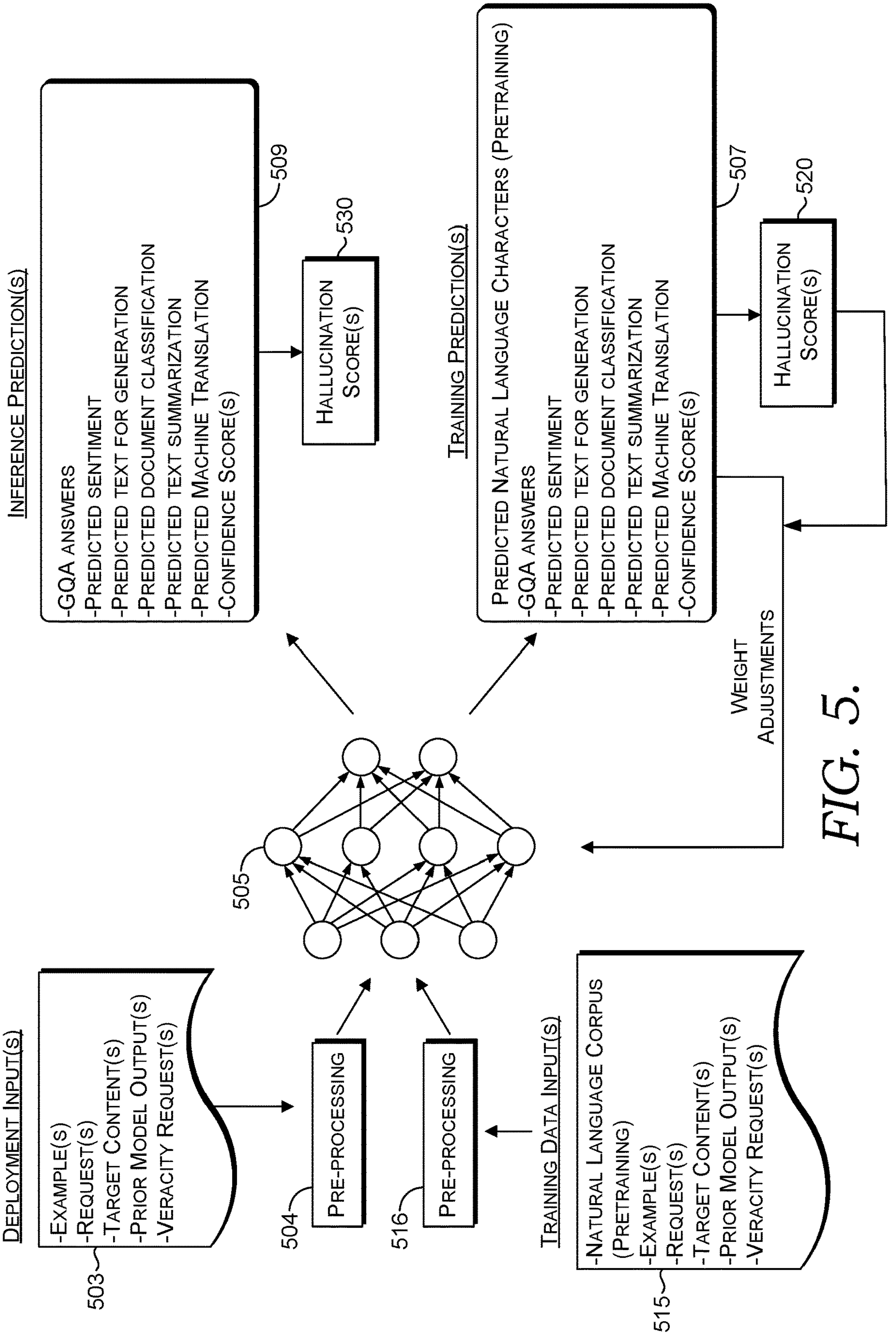
FIG. 5 is a schematic diagram illustrating how a neural network makes particular training and deployment predictions and how hallucination can be detected at training time and/or deployment time, according to some embodiments.

FIG. 5 is a schematic diagram illustrating how a neural network 505 makes particular training and deployment predictions and how hallucination can be detected at training time and/or deployment time, according to some embodiments. In one or more embodiments, the neural network 505 represents or includes at least some of the functionality as described with respect to the language model 400 of FIG. 4, the language model/layer 213 of FIG. 2, the language model output generator 102 of FIG. 1, or the language model 310 of FIG. 3. In some embodiments, the neural network 505 represents or includes alternative or additional model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

In some embodiments, the neural network 505, as illustrated in FIG. 5, has multiple input nodes (input layer), hidden nodes, and multiple output nodes (an output layer), where each node represents an input variable or feature (e.g., examples, data in the target content, etc.) and where each node comprises a linear/non-linear function and an activation function. Every node in one layer is connected to every other node in the next layer. A given node typically takes the weighted sum of its inputs, and passes it through an activation function (e.g., a dot product vector). This is the output of the node, which then becomes the input of another node in the next layer. The signal flows from left to right, and the final output is calculated by performing this procedure for all the nodes. Training a neural network typically means learning the weights associated with all the edges (the lines connecting the nodes). The input features (x) are typically fed into the linear/non-linear function of each node, resulting in a value, z. Then, the value z is fed into the activation function, which determines if a node is activated or inhibited (e.g., between 0 and 1). Thus, each node ultimately determines which nodes in the following layer get activated, until it reaches an output.

In some embodiments, before the pre-training data input(s) 515 (or the prompt engineering/deployment input(s) 504) are provided as input into the neural network 505, the inputs are preprocessed at 516 (or 504). In some embodiments, such pre-processing includes data wrangling, data munging, scaling, and the like. Data wrangling and data munging refers to the process of transforming and mapping data from one form (e.g., "raw") into another format with to make it more appropriate and useable for downstream processes (e.g., predictions 407). Scaling (or "feature scaling") is the process of changing number values (e.g., via normalization or standardization) so that a model can better process information. For example, some embodiments can bind number values between 0 and 1 via normalization. Other examples of preprocessing includes feature extraction, handling missing data, feature scaling, and feature selection.

Feature extraction involves computing a reduced set of values from a high-dimensional signal capable of summarizing most of the information contained in the signal. Feature extraction techniques develop a transformation of the input space onto the low-dimensional subspace that attempts to preserve the most relevant information. In feature selection, input dimensions that contain the most relevant information for solving a particular problem are selected. These methods aim to improve performance, such as estimated accuracy, visualization, and comprehensibility. An advantage of feature selection is that important information related to a single feature is not lost, but if a small set of features is required and original features are very diverse, there is chance of information being lost as some of the features must be omitted. On the other hand, with dimensionality reduction, also known as feature extraction, the size of the feature space can often be decreased without losing information about the original feature space.

In some embodiments, these feature extraction techniques include, but are not limited to Minimum Redundancy Maximum Relevance ("mRmR"), Relief, Conditional Mutual Information Maximization ("CMIM"), Correlation Coefficient, Between-Within Ratio ("BW-ratio"), Interact, Genetic Algorithms ("GA"), Support Vector Machine-Recursive Feature Elimination ("SVM-REF"), Principal Component Analysis ("PCA"), Non-Linear Principal Component Analysis, Independent Component Analysis, and Correlation based feature selection. These feature extraction techniques are useful for machine learning because they can reduce the complexity of input data and give a simple representation of data representing each variable in feature space as a linear combination of the original input variable.

In some embodiments, the pre-processing of the data at 516 and/or 504 includes missing data techniques. In some embodiments, these missing data techniques include complete case analysis, single imputation, log-linear models and estimation using the EM algorithm, propensity score matching, and multiple imputations. The technique confines attention to cases for which all variables are observed in a complete case analysis. In a single implicit imputation method, missing values are replaced by values from similar responding units in the sample. The similarity is determined by looking at variables observed for both respondent and non-respondent data. Multiple imputations replace each missing value with a vector of at least two imputed values from at least two draws. These draws typically come from stochastic imputation procedures. In the log linear model, cell counts of a contingency table are modeled directly. An assumption can be that, given expected values for each cell, the cell counts follow independent multivariate Poisson distributions. These are conditional on the total sample size, with the counts following a multinomial distribution.

In some embodiments, the preprocessing at 516 and/or 504 includes outlier detection and correction techniques for handling outlier data within the input data 515/503. Outliers, by virtue of being different from other cases, usually exert a disproportionate influence on substantive conclusions regarding relationships among variables. An outlier can be defined as a data point that deviates markedly from other data points.

For example, error outliers are data points that lie at a distance from other data points because they result from inaccuracies. More specifically, error outliers include outlying observations that are caused by not being part of the targeted population of data, lying outside the possible range of values, errors in observation, errors in recording, errors in preparing data, errors in computation, errors in coding, or errors in data manipulation. These error outliers can be handled by adjusting the data points to correct their values or more such data points from the data set. In some implementations, particular embodiments define values more than three scaled median absolute deviations ("MAD") away from the median as outliers. Once defined as an outlier, some embodiments replace the values with threshold values used in outlier detection.

In some embodiments, the preprocessing at 516 and/or 504 includes feature scaling on the input(s) 516 and/or 504 as part of the data preprocessing process. Feature scaling is a method to unify self-variables or feature ranges in data. In some embodiments, feature scaling is a necessary step in the calculation of stochastic gradient descent. Particular embodiments can perform various feature scaling techniques. In some embodiments, these feature scaling techniques include, but are not limited to, data normalization methods and interval scaling.

In some embodiments, preprocessing at 516 and/or 504 includes data normalization. Data normalization is a basic work of data mining. Different evaluation indicators often have different dimensions, and the difference in numerical values may be very large. Without processing, the results of data analysis may be affected. Standardized processing is needed in order to eliminate the influence of dimension and range differences between indicators. The data is scaled to a specific area to facilitate comprehensive analysis. The premise of the normalization method is that the eigenvalues obey the normal distribution, and each genus is transformed into a standard positive distribution with a mean of 0 and a variance of 1 by translation and scaling data transformation. The interval method utilizes the boundary information to scale the range of features to a range of features. For example, the commonly used interval scaling methods such as [0, 1] use two extreme values (maximum and minimum values) for scaling.

In some embodiments, the preprocessing at 516 and/or 504 includes feature selection at the input data 515 and/or 503. Feature selection techniques can be performed for dimensionality reduction from the extracted features. The feature selection techniques can be used to reduce the computational cost of modeling, to achieve a better generalized, high-performance model that is simple and easy to understand. Feature extraction techniques can be performed to reduce the input data's dimensionality. However, in some implementations, the resulting number of features may still be higher than the number of pre-training data 515. Therefore, further reduction in the dimensionality of the data can be performed using feature selection techniques to identify relevant features for classification and regression. Feature selection techniques can reduce the computational cost of modeling, prevent the generation of a complex and overfitted model with high generalization error, and generate a high-performance model that is simple and easy to understand. Some embodiments use the mRmR sequential feature selection algorithm to perform feature selection. The mRmR method is designed to drop redundant features, which can design a compact and efficient machine learning-based model.

After preprocessing at 516, in various embodiments, the neural network 505 is trained (e.g., via pre-training and/or prompt engineering) using one or more data sets of the preprocessed training data input(s) 515 in order to make acceptable loss training prediction(s) 507 at the appropriate weights, which will help later at prompt engineering or deployment time to make correct inference prediction(s) 509. In one or more embodiments, learning or training includes minimizing a loss function between the target variable (for example, an incorrect prediction that a phrase has semantic meaning X in pre-training) and the actual predicted variable (for example, a correct prediction that the phrase has semantic meaning Y). Based on the loss determined by a loss function (for example, Mean Squared Error Loss (MSEL), cross-entropy loss, etc.), the loss function learns to reduce the error in prediction over multiple epochs or training sessions so that the neural network 505 learns which features and weights are indicative of the correct inferences, given the inputs. Accordingly, it is desirable to arrive as close to 100% confidence in a particular classification or inference as close as possible so as to reduce the prediction error. In an illustrative example, the neural network 505 learns over several epochs that for a given set of character sequences, the correct meaning or the text to be generated next is Y (e.g., via NSP or MLM).

Subsequent to a first round/epoch of training, the neural network 505 makes predictions with a particular weight value, which may or may not be at acceptable loss function levels. For example, the neural network 505 may process the pre-processed training data input(s) 515 a second time to make another pass of prediction(s) 507. This process may then be repeated over multiple iterations or epochs until the weight values are set for optimal or correct predicted value(s) is learned (for example, by maximizing rewards and minimizing losses) and/or the loss function reduces the error in prediction to acceptable levels of confidence. For example, the neural network 505 may learn that for a given prompt Y, the given answer is T or vice versa and adjust weights accordingly.

In one or more embodiments, the neural network 505 converts or encodes the deployment input(s) 503 and training data input(s) 515 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value or other content in pages into one or more feature vectors.

In some embodiments, such as in clustering techniques, the neural network 505 learns, via training, parameters, or weights so that similar features are closer (for example, via Euclidian or cosine distance) to each other in feature space by minimizing a loss via a loss function (for example, Triplet loss or GE2E loss). Such training occurs based on one or more of the preprocessed training data input(s) 515, which are fed to the neural network 505. One or more embodiments determine one or more feature vectors representing the input(s) 515 in vector space by aggregating (for example, mean/median or dot product) the feature vector values to arrive at a particular point in feature space.

In one or more embodiments, the neural network 505 learns features from the pre-training data input(s) 515 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. For example, correct answers to given questions are given weights closer to 1, whereas incorrect answers are given weights of 0.

In another illustrative example of training, one or more embodiments learn an embedding of feature vectors based on learning (for example, deep learning) to detect similar features between training data input(s) 515 in feature space using distance measures, such as cosine (or Euclidian) distance. For example, the training data input 515 is converted from string or other form into a vector (for example, a set of real numbers) where each value or set of values represents the individual features in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, the neural network 505 can learn that the semantic meaning of "Apple" when next to certain other words refers to a company, as opposed to a fruit. Consequently, this pattern can be weighted (for example, a node connection is strengthened to a value close to 1), whereas other node connections (for example, fruit) are inhibited. In this way, embodiments learn weights corresponding to different features such that similar features found in inputs contribute positively for predictions.

In some embodiments, such training is supervised or not supervised using annotations or labels. For example, in some embodiments, training includes (or is preceded by) annotating/labeling training data 515 so that the neural network 505 learns the features, which is used to change the weights/neural node connections for future predictions. As such, the neural network 505 accordingly adjusts the weights or deactivates nodes such that certain words are likely to follow other words (e.g., in NSP or MLM). For example, each prompt may be labeled with the correct answer or each answer may be labeled with the correct prompt.

In some embodiments, after the neural network 505 has initially adjusted its weights during training to arrive at optimal loss function levels, particular embodiments, such as the hallucination model/layer 215 and/or the hallucination detector 126 detects hallucination via the hallucination score(s) 520, as described herein. In these embodiments, the initialization weight value is the final training value before optima loss function levels are achieved. However, if the likelihood of hallucination is detected to be above a threshold, particular embodiments once again adjust the weights, as illustrated in FIG. 5. In some embodiments, such weights are adjusted based on the neural network 505 iterating (e.g., making a prediction without examples or different examples) or continuously producing an output until the output has a likelihood of hallucination below a threshold. In these embodiments, when this occurs, the neural network 505 learns which features or otherwise learns patterns in the new outputs (e.g., a new text summary) and/or new inputs (e.g., examples were not used or other examples were used). In this way, specific inputs and outputs are learned or mapped together in prompt engineering, for example. For instance, for a given request "make a summary of document D," the model can learn that the optimal example (an example with an acceptable hallucination score) to use is Y (and consequently activate a node closer to 1) instead of Z (and consequently inhibit the node closer to 0) and that the output is a specific Summary T (activate) instead of other summaries G (inhibit), where activations are based on the likelihood of hallucination being low.

In one or more embodiments, subsequent to the neural network 505 training, the neural network 505 (for example, in a deployed state) receives one or more of the pre-process deployment input(s) 503. When a machine learning model is deployed, it has typically been trained, tested, and packaged so that it can process data it has never processed. Responsively, in one or more embodiments, the deployment input(s) 503 are automatically converted to one or more feature vectors and mapped in the same feature space as vector(s) representing the training data input(s) 515 and/or training predictions(s) 507. Responsively, one or more embodiments determine a distance (for example, a Euclidian distance)

between the one or more feature vectors and other vectors representing the training data input(s) 515 or predictions, which is used to generate one or more of the prediction(s) 509. In some embodiments, the preprocessed input(s) 503 are fed to the layers of neurons of the neural network 505, where the weights dictate the output.

In an illustrative example, the neural network 505 receives one or more examples, one or more requests (e.g., "Did Harry give details about project X), target content (e.g., a meeting transcript that describes a meeting about project X), prior model outputs (e.g., the output 312 of FIG. 3), and/or a veracity request. The neural network 505 then generates a GQA answer to the request based on the inputs by, for example, determining a distance (e.g., a Euclidian distance) between the vector representing the deployment input(s) 503 and the training data input(s) 515, where the input(s) 503 are passed through the same activated/deactivated nodes. Based on the distance being within a threshold distance, particular embodiments generate a score at prediction(s) 509, such "Harry said the project is due in two weeks and that we must assemble a team by Tuesday." In another example, the deployment input(s) 503 are run through the neural network 505, where the weights have been learned such that the input(s) 503 are mapped, for example, via a classifier or regression component, to the correct class or prediction.

In certain embodiments, the prediction(s) 509 (and/or 507) may either be hard (for example, membership of a class is a binary "yes" or "no") or soft (for example, there is a probability or likelihood attached to the labels). Alternatively or additionally, transfer learning may occur. Transfer learning is the concept of re-utilizing a pre-trained model for a new related problem (for example, a new video encoder, new feedback, etc.).

In some embodiments, responsive to the neural network 505 making predictions 509, hallucination score(s) 510 can additionally or alternatively be determined as described with respect to the hallucination score(s) 520. However, the core difference between the hallucination score(s) 520 and 510 is that after deployment, the hallucination score(s) 510 are not used to retrain the model or otherwise adjust weights. Rather, these hallucination scores or indications thereof can be directly provided to end-users to give them a sense of whether a deployed model is hallucinating and therefore whether the users should rely on the inference predictions 509. For example, if the user received an indication of high hallucination, the user may reformulate the request in a different way, or the like to improve the likelihood of hallucination.

Figure 6:
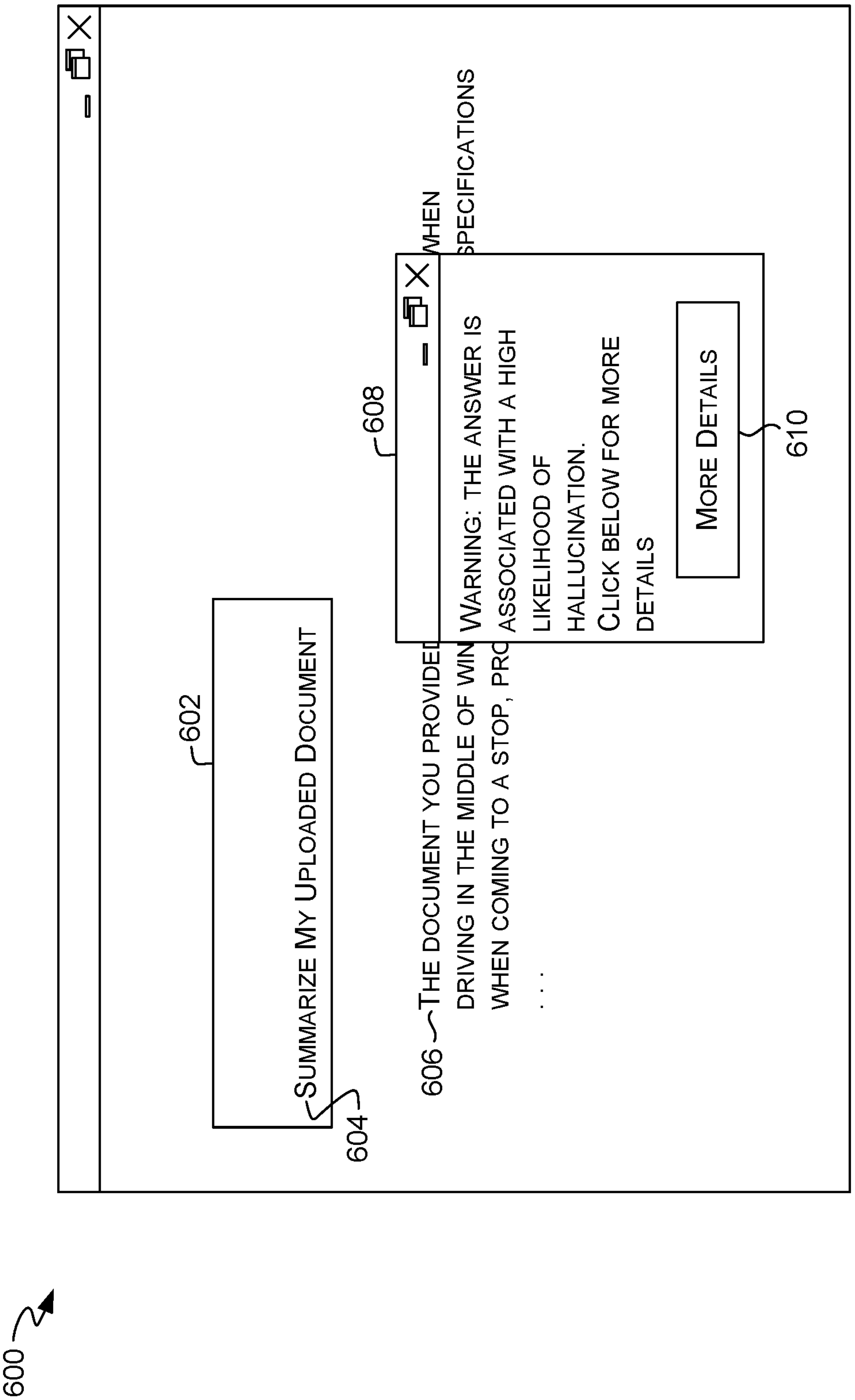
FIG. 6 is a screenshot of an example user interface for alerting users of a high likelihood of hallucination in a given output, according to some embodiments.

FIG. 6 is a screenshot 600 of an example user interface for alerting users of a high likelihood of hallucination in a given output, according to some embodiments. The field 602 is configured to receive a request 604 (i.e., "summarize my updated document"). Accordingly, at a first time, particular embodiments receive an indication that the use has uploaded a particular file or document. At a second time, some embodiments receive another indication that the user has issued the request 604. Responsive to receiving this second indication, in various embodiments, one or more components of the system 100—e.g., the language model output generator 102, the token analyzer 104, the hallucination detector 126, and the presentation component 130—performs their functionality. Accordingly, the request 604 is executed by generating the output 606, which includes the natural language text 606, which is a summary of the uploaded document. Responsively, particular embodiments cause presentation of the pop-up window 608. This is an indicator that one or more portions the answer 606 likely contain hallucination.

In response to receiving an indication that the user has selected the "more details" button 610, particular embodiments provide additional details as to the source, reasoning, or cause of the detected hallucination. For example, based on the functionality of the token analyzer 104, some embodiments cause presentation, to a user device, of those non-common tokens or words that are not found in the target content but are found to occur in at least one example. In another example, based on the functionality of the example excluder 112, some embodiments cause presentation of the example (e.g., of a few-shot example) that is the likely to be the source of the hallucination. In yet another example, some embodiments generically cause presentation of an indication of whether the source of hallucination is believed to be based on examples or general knowledge. In some embodiments, subsequent to receiving an indication that the user has selected the "more details" button 610, some embodiments cause presentation of a second button (not shown), which is indicative of a request to retrain the model as a part of prompt engineering, as described herein. Accordingly, in response to receiving an indication that the user has selected this second button, particular embodiments perform prompt learning functionality (e.g., as described with respect to FIG. 5) to learn which request or examples belongs to which output or vice versa based on being at acceptable hallucination levels or scores.

FIG. 7 is a screenshot 700 of an example user interface for presenting an output at an acceptable hallucination confidence level, according to some embodiments. At a first time, particular embodiments receive an indication a user has issued the request 704 (i.e., "What did Jane Say about the Final Sales Numbers for February.") Responsive to receiving this indication, in various embodiments, one or more components of the system 100—e.g., the language model output generator 102, the example excluder 112, the hallucination detector 126, and the presentation component 130—performs their functionality by ingesting the meeting transcript 702 (the target content). As illustrated in FIG. 7, some embodiments cause presentation of the alert indicator 706, which indicates that an original answer or output contained a high likelihood of hallucination. In some of these embodiments, particular embodiments therefore refrain from presenting or displaying the original output since it is incorrect. As described herein, however, some embodiments keep iterating (e.g., by feeding the model different examples and/or automatically changing the query (e.g., adding words, removing words, rephrasing using same semantic meaning)) if and until an output is found with an acceptable level of hallucination, as illustrated by the output 808. Such output contains a likelihood of hallucination of 0.5%, as illustrated by the indicator 710.

FIG. 8 is a flow diagram of an example process 800 for detecting a likelihood of hallucination, according to some embodiments. The process 800 (and/or any of the functionality described herein, such as 900 or 1000) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIGS. 1-7, such as any block contained in the processes 900 or 1000 of FIGS. 9 and 10 respectively). The computer-implemented method, the system (that includes at least one computing device having at least one processor and at least one computer readable storage medium), and/or the computer readable medium as described herein may perform or be caused to perform the process 800 or any other functionality described herein.

Per block 802, some embodiments receive an output (e.g., a generative text prediction) of a language model based on the language model processing (e.g., being fed) an input, where the input comprises: a request, target content, and one or more examples. In some embodiments, the "output" represents the output of the language model output generator 102, the output 214 of FIG. 2, the predictions 507, and/or 509 of FIG. 5.

A "language model" is a set of statistical or probabilistic functions that performs Natural Language Processing (NLP) in order to understand, learn, and/or generate human natural language content. For example, a language model can be a tool that determines the probability of a given sequence of words occurring in a sentence (e.g., via NSP or MLM) or natural language sequence. Simply put, it can be a tool which is trained to predict the next word in a sentence. A language model is called a large language model ("LLM") when it is trained on enormous amount of data. Some examples of LLMs are GOOGLE's BERT and OpenAI's GPT-2 and GPT-3. GPT-3, which is the largest language model with 175 billion parameters trained on 570 gigabytes of text. These models have capabilities ranging from writing a simple essay to generating complex computer codes—all with limited to no supervision. Accordingly, an LLM is a deep neural network that is very large (billions to hundreds of billions of parameters) and understands, processes, and produces human natural language by being trained on massive amounts of text. These models can predict future words in a sentence letting them generate sentences similar to how humans talk and write. In some embodiments, the LLM is pre-trained (e.g., via NSP and MLM on a natural language corpus to learn English) without having been fine-tuned, but rather uses prompt engineering/prompting/prompt learning using one-shot or few-shot examples.

In some embodiments, "target content" described herein refers to any suitable data object that includes natural language (e.g., English) characters and that is used as part of an input (e.g., a part of a prompt) to help the model generate an output. For example, in some embodiments, target content is or includes a meeting transcript, which includes natural language characters indicating content spoken in a meeting (e.g., via speech-to-text functionality). In some embodiments, such meeting transcript includes name identifiers and time-stamps indicating when and who is speaking at the meeting. In some embodiments, target content alternatively or additionally includes a file (e.g., a PDF file), a document, an instance of an application (e.g., a window, a pagelet, an ANDROID activity, etc.), or any suitable data object.

In some embodiments, the "one or more examples" described in block 802 represent one-shot or few-shot prompting examples used by language models for prompt engineering, prompt learning, answering, or otherwise training a language model. As described herein, in some embodiments, an "example" refers to one or more model (e.g., representative or exemplary) outputs associated with the request, where the "model output" at least partially indicates how the output should be formatted (e.g., via sentence structure or syntax, word choices, length (e.g., number of words) in the output, etc). In some embodiments, an "example" refers to natural language content that a model uses as a guide for structuring or styling its output and the model typically does not use the example as a guide for deriving substantive natural language text (e.g., the subject or object in a sentence) in the example to copy over to the output. For example, if a request is, "draft a rejection letter for the applicant John," an example is, "dear Jane, I regret to inform you that you were not accepted into the engineering program . . . " and target content may include John's credentials and the board's requirements for getting accepted to a summer internship. The output may say something like, "dear John, I regret to inform you that you were not accepted into the summer internship." Accordingly, the example was used for the output's format and style "dear . . . , I regret to inform you that you were not accepted . . . " (i.e., various syntactical and introductory words were copied to the output, but not all words were copied over). However, the name was changed (from Jane to John) and the engineering program piece was changed to summer internship program, all based on what was in the target content but not the example, otherwise the output would have been nonsensical. In some embodiments, a "request" as described herein includes a question (e.g., "what did Martha say in the meeting"), an instruction (e.g., "summarize document D,"), a prompt, or other request issued in natural language.

In some embodiments, in determining how much text from the example gets copied to the output is based on performing NLP functionality, such as POS tagging, entity recognition, For example, some embodiments tag the parts of speech or entity type of each word. In these embodiments, all words that are the certain parts of speech or entities (e.g., persons) are to not be included (or are to be included) in the output.

In some embodiments, the "output" described at block 802 refers to or includes any of the outputs described herein, such as sentiment analysis, answering one or more questions, automatic summarization, text generation, machine translation, document classification, any confidence level scores associated therewith, or any other suitable NLP task. In various embodiments, the target content may comprise a meeting transcript or similar corpus of text. The language model output may comprise a meeting summary or an answer to a question about the meeting. In some instances, examples are provided according to few-shot prompting techniques and thus comprise examples of desired output such as the formatting, style, or types of content to be included. In some embodiments, the request comprises the user request for what the user wants the model to do, such as generating a summary (e.g., a meeting summary) of the target content (e.g., a meeting transcript) or answering a question about the target content.

Per block 804, some embodiments determine a set of (e.g., 1 or more) tokens occurring (e.g., are located in) in the output that are not found in the target content, but are found to occur in at least one example, of the one or more examples. For example, the token may be a word or phrase, such as "medical waste" that occurs in one of the examples but not in the target content. In some embodiments, block 804 includes the functionality as described with respect to the target content—example overlap module 106.

Per block 806, based at least in part on the determining (block 804), for each token of the set of tokens, some embodiments determine (e.g., generate or lookup in a data structure) a frequency score indicating how common (and/or uncommon) the token is or occurrence frequency for the token. In some embodiments, block 806 includes the functionality as described with respect to the token commonality module 108 of FIG. 1. For example, a score is determined for each token (e.g., word) representing how common or rare it is. In some embodiments, common words have a score close to zero. Conversely, in these embodiments, rare words have a score close to 1. In some embodiments, block 806 includes functionality similar to TF-IDF across a network, such as the internet. For example, in one implementation, the score is determined as (1 minus (the token's occurrence frequency in the example divided by the frequency of the word "the" (or the most commonly occurring word) in all data sources (e.g., trained on or found on the internet)). In yet another example, the frequency score is determined as (1−(the token's occurrence frequency in the example divided by the token's frequency in all data sources). Put differently, the determining of the frequency score comprises dividing the token's occurrence frequency in the at least one example by a frequency of the token in all data sources that results in a quotient, and taking 1 minus the quotient. For example, the "token's occurrence frequency" may be 6 because the term "the" was found in an example 6 different times. The term "the," may be found a total of 600 times in many other documents, such as training data, via web scraping, or otherwise found on the internet. Accordingly, 6/600=0.01. 1−0.01=0.99 (i.e., the frequency score), which is very close to 1. The closer to 1 a value is the more common it is. However, in some embodiments, if the value exceeds a predefined threshold, such as 0.065, hallucination is indicated as not as likely since the word is very common. Alternatively, in some embodiments, instead of a predefined threshold, each frequency score may proportionately and directly correspond to the likelihood of hallucination. That is, the higher the value is closer to 1, the lower the likelihood of hallucination of the corresponding token and the lower the value is closer to 0, the higher the likelihood of hallucination.

In response to block 805, some embodiments determine a composite frequency score from the frequency score of the set of tokens and determine whether the composite frequency score exceeds a threshold. Accordingly, for example, the determining of the hallucination score (block 808) is based on whether the composite frequency score exceeds a threshold. In some embodiments, a "composite frequency score" is the sum of all of the frequency scores (the common/rarity scores) determined for each token at block 805. In other embodiments, the composite frequency score is the sum of the top 5 (or top N) highest (or lowest) frequency scores. In yet another embodiment, the frequency scores are first normalized based on length of the output, and then summed to determine the composite frequency score. For example, the higher the length, the more (or less) a frequency score is weighted (e.g., by multiplying an integer or float by the corresponding frequency score). Likewise, the lower the length, the less (or more) the frequency score is weighted. In some embodiments, the "threshold" represents any predetermined or programmed value (e.g., 0.8), such as a programmed frequency score in a conditional statement (an "if-then" statement). Alternatively, in some embodiments, the threshold represents a cardinality value or non-predetermined value, such as whatever the 3 highest (or lowest) values are represent the threshold.

Per block 808, based at least in part on the determining of the frequency score for each token at block 806, some embodiments determine (e.g., generate or retrieve) a hallucination score indicating a likelihood of hallucination in the output. For example, using the illustration above, the composite frequency score is evaluated against a threshold. If the composite frequency score exceeds the threshold, then there is a high likelihood of hallucination in the output. In another example, if any one of the frequency scores exceed a threshold, then there is a high likelihood of hallucination. In some embodiments, the likelihood of hallucination is directly proportional to the frequency score, meaning that the likelihood of hallucination may correspond to a spectrum ranging from low likelihood, to medium, to high likelihood of hallucination. In some embodiments, the functionality of block 808 includes the functionality as described with respect to the hallucination detector 126 of FIG. 1, the hallucination model/layer 215 of FIG. 2, and/or the hallucination score(s) 510 or 507 of FIG. 5.

In some embodiments, hallucination is detected in alternative or additional ways than what is illustrated in block 808 (and blocks 804 and 806). For example, some embodiments provide a second input to the language model, where the second input includes the target content, the output, and a first output confidence, and explicitly excludes or refrains from using the one or more examples. Subsequently, particular embodiments receive a second output from the language model, where the second output comprises a second output confidence. Particular embodiments then compare the first output confidence and the second output confidence. Based on the comparing, some embodiments generate a third score indicating a likelihood that hallucination exists. In some embodiments, such functionality represents or includes the functionality as described with respect to the example excluder 112 and FIG. 3 and the hallucination detector 126 of FIG. 1.

In yet another additional or alternative example of detecting hallucination, some embodiments parse the output into sections, where each section comprises a portion of the output. For each section of the sections, particular embodiments generate a veracity request indicative of a request to determine a veracity of the section. Some embodiments additionally provide each veracity request for each section and the target content as second input to the language model. In response to such providing, some embodiments receive a second output of the language model, where the second output comprises a reply to the veracity request and a corresponding confidence score that the reply is yes (or affirmative or is otherwise responsive). Based on the receiving of the second output, some embodiments generate a third score that indicates whether the hallucination is likely in the output. In some embodiments, such functionality represents or includes the functionality as described with respect to the veracity determiner 118 of FIG. 1 and the hallucination detector 126 of FIG. 1.

Per block 810, based at least in part on the determining of the hallucination score, some embodiments cause presentation (e.g., display or audio output), at a user device (e.g., a mobile phone or smart speaker), of an indicator associated with the hallucination score. For example, such indicator can include or represent any content within the pop-up window 608 of FIG. 6, the indicator 706, and/or the hallucination score itself in 710 of FIG. 7.

In some embodiments, various aspects of the output or detected likelihood *of hallucination or caused to be presented and some aspects of the output or detected likelihood of hallucination is excluded from being presented. For example, a user device may be notified of a likely hallucination without receiving the output (e.g., a display screen does not contain the output); the LLM output may be withheld from the user and the LLM prompt that led to the hallucination may be changed in some way (e.g., using different examples or reformatting a query) and repeatedly fed to the model until an output is generated that is not likely to contain hallucination (at which point it is presented to the user device); or the output may be provided with an indication that the output likely or likely does not contain hallucination (or the degree, measure, or percentage of hallucination).

FIG. 9 is a flow diagram of an example process 900 for detecting a likelihood of hallucination, according to some embodiments. In some embodiments, the process 900 includes or represents the functionality as described with respect to the example excluder 112 of FIG. 1, and/or the functionality as described with respect to FIG. 3.

Per block 903, some embodiments receive a first output of a language model based on the language model processing a first input, where the first input comprises: a first request, target content, and one or more examples. In some embodiments, the first output comprises a first output confidence. For example, based on the first request being "summarize document X," a language model (e.g., the language model 400 or the neural network 505) may responsively generate a first output, "document X is about . . . " (e.g., the output 408) with an associated or accompanying first output confidence, which is a score indicative of the model's confidence level that the first output is correct or responsive to the first request.

Per block 905, some embodiments provide (e.g., in response to the receiving of the first output at block 903) a second input to the language model, where the second input comprises: the target content and the first output, and wherein the second input excludes any examples (e.g., there are no one-shot or few-shot examples used, including the one or more examples used at block 903). In some embodiments, the second input at block 905 represents or includes the input 313 of FIG. 3.

Per block 907, some embodiments receive (e.g., in response to the providing of the second input at block 905) a second output from the language model, where the second output comprises a second output confidence. In an illustrative example, based on ingesting the second input at block 905, a model (e.g., the language model 400 of FIG. 4) generate a second summary of document D (without ingesting examples), and a second confidence that the second output is correct or otherwise is correctly responsive to a second request (which may also be part or include in the second input). The confidences indicate a probability of the model's confidence in the output responding to the second request. For example, the second output confidence indicates a LLM's confidence to its answer to the second request about whether the summary (the first output) is an accurate summary of the meeting transcript.

Per block 909, some embodiments compare the first output confidence and the second output confidence. In some embodiments, this includes the functionality as described with respect to the confidence comparator 116 of FIG. 6. For example, some embodiments employ logical operators that compute the difference in confidence level values/scores between the first output confidence and the second output confidence.

Per block 911, based at least in part on the comparing at block 909, some embodiments generate a hallucination score that indicates a likelihood that hallucination exists (e.g., in the first output). In some embodiments, detecting the likelihood of hallucination is based on whether the difference between confidence levels exceed some threshold. For example, particular embodiments can determine that a hallucination is likely where the confidences (a probability value) typically drops by several orders of magnitude. For instance, where the first output confidence is 0.5 and the second output confidence is 0.001, then a hallucination likely exists.

In some embodiments, the process 900 includes additional functionality. For example, in some embodiments, responsive to block 911, some embodiments perform block 810 of FIG. 8 to cause presentation, at a user device, of an indicator that indicates the likelihood of hallucination (e.g., a color-coded indicator indicating "low" likelihood, a "medium" likelihood, or a "high" likelihood of hallucination detected). In another example, the process 900 can additionally include other methods of detecting hallucination, such as the entire process 800 of FIG. 8.

FIG. 10 is a flow diagram of an example process 1000 for detecting a likelihood of hallucination, according to some embodiments. In some embodiments, the process 1000 includes or represents the functionality as described with respect to the veracity determiner 118 of FIG. 1. The process 1000 addresses a hallucination situation where the outside knowledge (the greater internet) is the source of the hallucination, referred to as "general knowledge hallucination." Per block 1002, some embodiments receive a first output of a language model based on the language model processing a first input, wherein the first input comprises a request and target content. For example, the target content may comprise a meeting transcript or document may comprise any suitable request, such as a question that states, "what did Thomas Edison say during the meeting?" which requires the meeting transcript to be searched to look for the corresponding answer to such question.

Per block 1004, some embodiment parse the first output into sections, where each section comprises a portion of the first output. In some embodiments, block 1004 includes or represents the functionality as described with respect to the parsing module 120 of FIG. 1. For instance, the first output can be broken into discrete chunks (e.g., extracting words of the output and copying such words as unique segments in memory). In an illustrative example, the output may be parsed into separate sentences. In some embodiments, the sections may overlap (e.g., a first chunk may be a phrase or entity occurring the first sentence, and the second chunk may be the entire first sentence. In another example, using Thomas Edison illustration above, a first section of the first output may be "Thomas Edison said we need to increase efficiency," (which is based on the question "what did Thomas Edison say during the meeting?").

Per block 1006, for each section of the sections, some embodiments generate a veracity request, which is indicative of a request to determine a veracity of the section. "Veracity" as described herein refers to the truthfulness, faithfulness, or accuracy of the natural language text. In some embodiments, block 1006 includes or represents the functionality as described with respect to the veracity request generator 122 of FIG. 1. In an example using the Thomas Edison illustrations above, a veracity request may be one of the following: "Does the name 'Thomas Edison' occur in the target content?" "Did Thomas Edison attend the meeting?" or "Did Thomas Edison talk about efficiency?" In another example, where the request is to generate some text, such as a summary, the veracity request may be the concept of asking the model whether certain words, entities, or concepts occurring in the generative text occur in the target content or outside knowledge.

Per block 1008, some embodiments provide each veracity request for each section and the target content as second input to the language model. For example, some embodiments provide, as an input prompt, the veracity requests (questions) about Thomas Edison and the meeting transcript to the language model.

Per block 1010, in response to the providing at block 1008, some embodiments receive a second output of the language model, where the second output comprises a reply to the veracity request and a corresponding confidence that the reply confirms (or does not confirm) the veracity for each section. In some embodiments, block 1010 includes or represents the functionality of the veracity reply module 124 of FIG. 4. The corresponding confidence comprises a probability score or value. For example, the confidence can be a log probability of the generated "yes" or "no" answer to the veracity request questions about Thomas Edison. In some embodiments, if the answer or reply is "no," then the corresponding confidence is 1 minus the corresponding confidence of the "no" answer. In an illustrative example of block 1010, the second output may be as follows "0.90 yes," which indicates that the probability of the question "was Thomas Edison at the meeting" has a 90% chance of being in the affirmative of 90% of belonging to answer "yes." The second output may also contain similar confidences for other sections, such as "0.80 yes, "0.30 yes," etc.

In response to block 1010 (or in response to providing a veracity request and the target content), some embodiments determine a composite confidence score from each reply (e.g., answer) received for each section of the parsed output. In some embodiments, such composite confidence score is the sum of each confidence generate at block 1008, or may be a sum of the top N confidences. Additionally or alternatively, each confidence is weighted or multiplied by a certain value to represent the important or significance of the section. For example, Per block 1012, based at least in part on the receiving of the second output, some embodiments generate a hallucination score that indicates whether hallucination is likely in the first output. For example, the composite frequency score described above can be evaluated against a threshold. If the composite frequency score exceeds the threshold, then there is likely hallucination in the output in some embodiments. In some embodiments, the threshold is determined based on how the composite frequency score is determined.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

Other Embodiments

In some embodiments, a system, such as the computerized system described in any of the embodiments above, comprise at least one computer processor, one or more computer storage media storing computer-useable instructions that, when used by the at least one computer processor, cause the at least one computer processor to perform operations. The operations comprise: receive an output of a language model based on the language model processing an input, wherein the input includes: a request, target content, and an example output comprising a representation that indicates, at least partially how the output should be formatted; determine a set of tokens, comprising at least one token, occurring in the output that are not found in the target content but are found to occur in the example output; based at least in part on the determining, for each token of the set of tokens, determine a frequency score indicating occurrence frequency for the token; based at least in part on the determining of the frequency score for each token, determine a hallucination score indicating a likelihood of hallucination in the output; and based at least in part on the determining of the hallucination score, cause presentation, at a user device, of an indicator associated with the hallucination score.

Advantageously, these and other embodiments of the system, as described herein, have the technical effects of improved accuracy relative to existing models by implementing the technical solution of determining a hallucination score indicating a likelihood of hallucination, and/or prompt-based learning/training based on detected hallucination, which existing language models do not do. Further, these embodiments have the technical effect of improved accuracy by modifying the generative text output itself in some way based on detected hallucination (e.g., by refraining from displaying an output where the likelihood of hallucination is high). Various embodiments also have the technical effect of increased data security or privacy based on detecting hallucination.

In any combination of the above embodiments of the system, the operations further comprise: determine a composite frequency score by summing each frequency score determined for each token; and-determine whether the composite frequency score exceeds a threshold, wherein the determining of the hallucination score is further based on whether the composite frequency score exceeds the threshold, and wherein hallucination is likely when the composite frequency score exceeds the threshold.

In any combination of the above embodiments of the system, the output comprises a first output confidence, and wherein the operations further comprise: provide a second input to the language model, wherein the second input comprises: the target content and the output, and wherein the second input excludes any example outputs; and receive a second output from the language model, wherein the second output comprises a second output confidence.

In any combination of the above embodiments of the system, the operations further comprise: compare the first output confidence and the second output confidence; and based on the comparing, generate a second hallucination score that indicates a likelihood that hallucination exists.

In any combination of the above embodiments of the system, the operations further comprise: parse the output into a plurality of sections, each section comprising a portion of the output; for a first section of the plurality of sections, generate a veracity request indicative of a request to determine a veracity of the first section; and provide the veracity request of the first section and the target content as second input to the language model.

In any combination of the above embodiments of the system, the operations further comprise: in response to the providing, receive a second output of the language model, the second output comprising a reply to the veracity request and a corresponding confidence score that the reply indicates veracity; and based at least in part on the receiving of the second output, generate a second hallucination score that indicates whether hallucination is likely in the output.

In any combination of the above embodiments of the system, the determining of the frequency score comprises dividing the token's occurrence frequency in the example output by a frequency of the token occurring in multiple data sources, the dividing resulting in a quotient, and taking 1 minus the quotient.

In any combination of the above embodiments of the system, the target content includes one of: a meeting transcript, a file, or a document.

In any combination of the above embodiments of the system, the output example corresponds to one-shot or few-shot prompting.

In any combination of the above embodiments of the system, the at least one computer processor performs further operations comprising: based at least in part on the hallucination score indicating that the likelihood of hallucination in the output exceeds a threshold, refraining from causing presentation, at the user device, of the output.

In any combination of the above embodiments of the system, the at least one computer processor performs further operations comprising: in response to the refraining, generate a second output associated with a likelihood of hallucination that does not exceed the threshold; and in response to the generating of the second output, cause presentation, at the user device, of the second output.

Various embodiments are directed to computer-implemented method comprising the following operations: receiving a first output of a language model based on the language model processing a first input, wherein the first input comprises: a first request, target content, and one or more examples, the one or more examples include one or more model outputs associated with the first request, and wherein the first output comprises a first output confidence; providing a second input to the language model, wherein the second input comprises: the target content and the first output, and wherein the second input excludes any examples; in response to the providing the second input, receiving a second output from the language model, wherein the second output comprises a second output confidence; comparing the first output confidence and the second output confidence; and based at least in part on the comparing, generating a hallucination score that indicates a likelihood that hallucination exists in the first output.

Advantageously, these and other embodiments of the computer-implemented method, as described herein, have the technical effects of improved accuracy relative to existing models by implementing the technical solution of determining a hallucination score indicating a likelihood of hallucination, and/or prompt-based learning/training based on detected hallucination, which existing language models do not do. Further, these embodiments have the technical effect of improved accuracy by modifying the generative text output itself in some way based on detected hallucination (e.g., by refraining from displaying an output where the likelihood of hallucination is high). Various embodiments also have the technical effect of increased data security or privacy based on detecting hallucination.

In any combination of the above embodiments of the computer-implemented method, the method further comprising: determining a set of tokens occurring in the first output that are not found in the target content but are found to occur in at least one example, of the one or more examples; based at least in part on the determining, for each token of the set of tokens, determining a frequency score indicating how common the token is; and based at least in part on the determining of the frequency score for each token of the set of tokens, determining a second hallucination score indicating a likelihood of hallucination in the first output.

In any combination of the above embodiments of the computer-implemented method, the method further comprising: determining a composite frequency score from the frequency score of the set of tokens; and determining whether the composite frequency score exceeds a threshold, wherein the generating of the second hallucination score is further based on whether the composite frequency score exceeds the threshold.

In any combination of the above embodiments of the computer-implemented method, the method further comprising: parsing the first output into a plurality of sections, each section comprising a portion of the first output; for each section of the plurality of sections, generating a veracity request indicative of a request to determine a veracity of the section; and providing each veracity request for each section and the target content as third input to the language model.

In any combination of the above embodiments of the computer-implemented method, the method further comprising: in response to the providing of each veracity request, receiving a third output of the language model, the third output comprises a reply to the veracity request and a corresponding confidence score that the reply is yes; and based at least in part on the receiving of the third output, generating a second hallucination score that indicates whether hallucination is likely in the first output.

In any combination of the above embodiments of the computer-implemented method, the method further comprising: based at least in part on the hallucination score indicating that the likelihood of hallucination in the first output exceeds a threshold, refraining from causing presentation, at a user device, of the first output; in response to the refraining, generating a third output associated with a likelihood of hallucination that does not exceed the threshold; and in response to the generating of the third output, causing presentation, at the user device, of the third output.

In any combination of the above embodiments of the computer-implemented method, the generating of the hallucination score comprises: computing a difference between the first output confidence and the second output confidence; determining whether the difference exceeds a threshold; and generating the hallucination score based on whether the difference exceeds the threshold, wherein the hallucination likely exists if the hallucination score exceeds the threshold and the hallucination likely does not exist if the hallucination score does not exceed the threshold.

Various embodiments are directed to one or more computer storage media having computer-executable instructions embodied thereon that, when executed, by one or more processors, cause the one or more processors to perform operations comprising: receiving a first output of a language model based on the language model processing a first input, wherein the first input comprises a request and target content; parsing the first output into a plurality of sections, each section comprising a portion of the first output; for each section of the plurality of sections, generating a veracity request indicative of a request to determine a veracity of the section; providing each veracity request for each section and the target content as second input to the language model; in response to the providing, receiving a second output of the language model, the second output comprising a reply to the veracity request and a corresponding confidence score that the reply confirms the veracity for each section; and based at least in part on the receiving of the second output, generating a hallucination score that indicates whether hallucination is likely in the first output.

Advantageously, these and other embodiments of the computer storage media, as described herein, have the technical effects of improved accuracy relative to existing models by implementing the technical solution of determining a hallucination score indicating a likelihood of hallucination, and/or prompt-based learning/training based on detected hallucination, which existing language models do not do. Further, these embodiments have the technical effect of improved accuracy by modifying the generative text output itself in some way based on detected hallucination (e.g., by refraining from displaying an output where the likelihood of hallucination is high). Various embodiments also have the technical effect of increased data security or privacy based on detecting hallucination.

In any combination of the above embodiments of the one or more computer storage media, the generating of the hallucination score comprises: determining a composite confidence score by summing, for each section, the corresponding confidence score that the reply confirms the veracity; evaluating the composite frequency score against a threshold; and based on the composite frequency score exceeding the threshold, generating the hallucination score indicating that there is likely hallucination in the output.

Example Computing Architecture and Device

Figure 11:
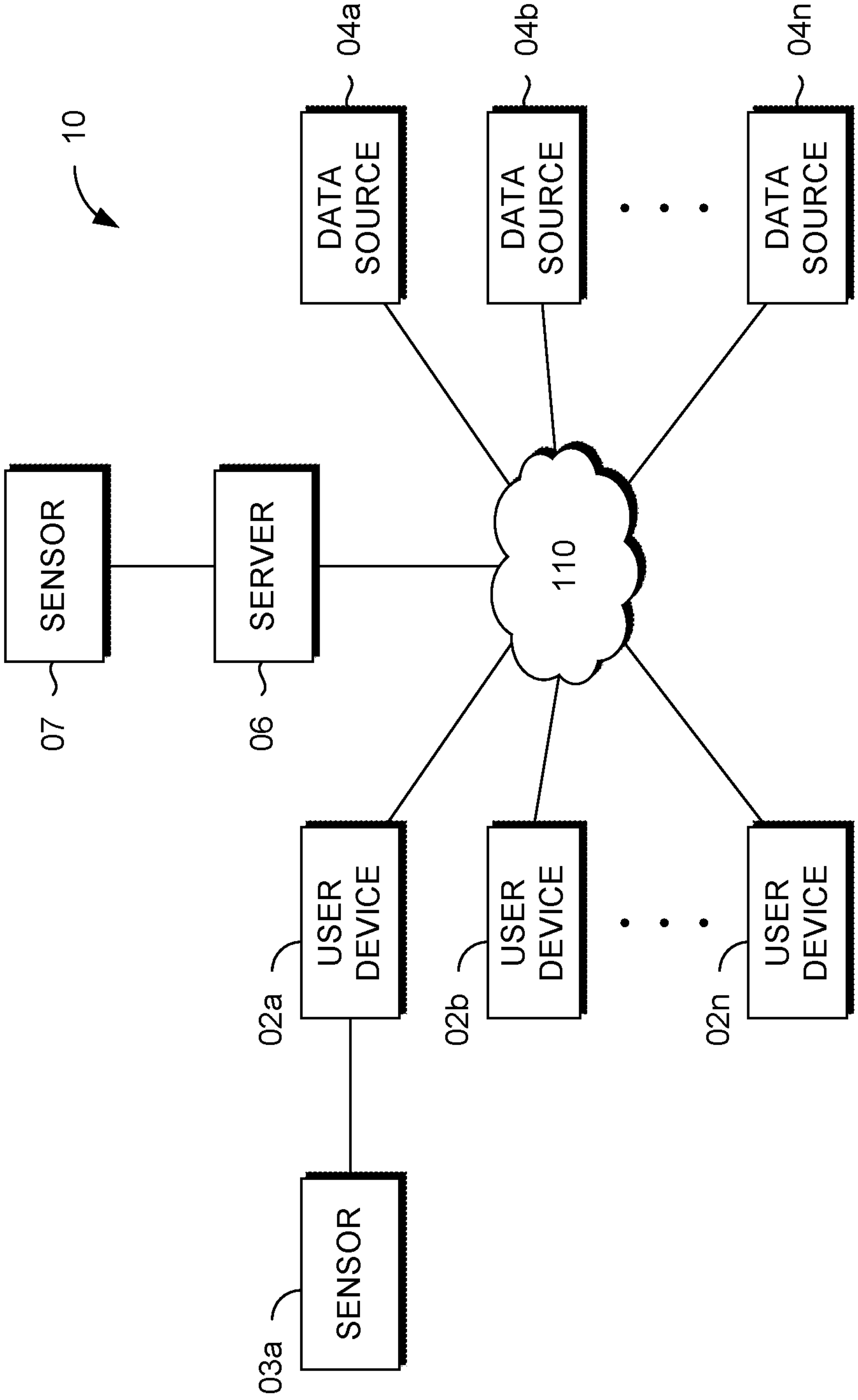
FIG. 11 is a block diagram illustrating an example operating environment suitable for implementing some embodiments of the disclosure.

Turning now to FIG. 11, a block diagram is provided showing an example operating environment 10 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 10 includes a number of user devices, such as user devices 02*a* and 02*b* through 02*n*; a number of data sources (for example, databases or other data stores, such as 105), such as data sources 04*a* and 04*b* through 04*n*; server 06; sensors 03*a* and 07; and network(s) 110. It should be understood that environment 10 shown in FIG. 11 is an example of one suitable operating environment. Each of the components shown in FIG. 11 may be implemented via any type of computing device, such as computing device 12 as described in connection to FIG. 12, for example. These components may communicate with each other via network (s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 10 within the scope of the present disclosure. Each may comprise a single device or multiple devices cooperating in a distributed environment. For instance, server 06 may be provided via multiple devices arranged in a distributed environment that collectively provide the functionality described herein. Additionally, other components not shown may also be included within the distributed environment.

User devices 02*a* and 02*b* through 02*n* can be client devices on the client-side of operating environment 10, while server 06 can be on the server-side of operating environment 10. Server 06 can comprise server-side software designed to work in conjunction with client-side software on user devices 02*a* and 02*b* through 02*n* so as to implement any combination of the features and functionalities discussed in the present disclosure. This division of operating environment 10 is provided to illustrate one example of a suitable environment, and there is no requirement for each implementation that any combination of server 06 and user devices 02*a* and 02*b* through 02*n* remain as separate entities. In some embodiments, the one or more servers 06 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network (s) 110.

In some embodiments, a user device 02*a* or server 06 alternatively or additionally comprises one or more web servers and/or application servers to facilitate delivering web or online content to browsers installed on a user device 02*b*. Often the content may include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 02*a* and 02*b* through 02*n* may comprise any type of computing device capable of use by a user. For example, in one embodiment, user devices 02*a* through 02*n* may be the type of computing device described in relation to FIG. 12 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 04*a* and 04*b* through 04*n* may comprise data sources and/or data systems, which are configured to make data available to any of the various constituents of operating environment 10 or system 100 described in connection to FIG. 1. Examples of data source(s) 04*a* through 04*n* may be one or more of a database, a file, data structure, corpus, or other data store. Data sources 04*a* and 04*b* through 04*n* may be discrete from user devices 02*a* and 02*b* through 02*n* and server 06 or may be incorporated and/or integrated into at least one of those components. In one embodiment, data sources 04*a* through 04*n* comprise sensors (such as sensors 03*a* and 07), which may be integrated into or associated with the user device(s) 02*a*, 02*b*, or 02*n* or server 06.

In some embodiments, operating environment 10 is utilized to implement one or more of the components of the system 100, described in FIG. 1. Operating environment 10 also can be utilized for implementing aspects of processes 800 (FIG. 8), 900 (FIG. 9) and/or any other functionality as described in connection with FIGS. 1-9.

Figure 12:
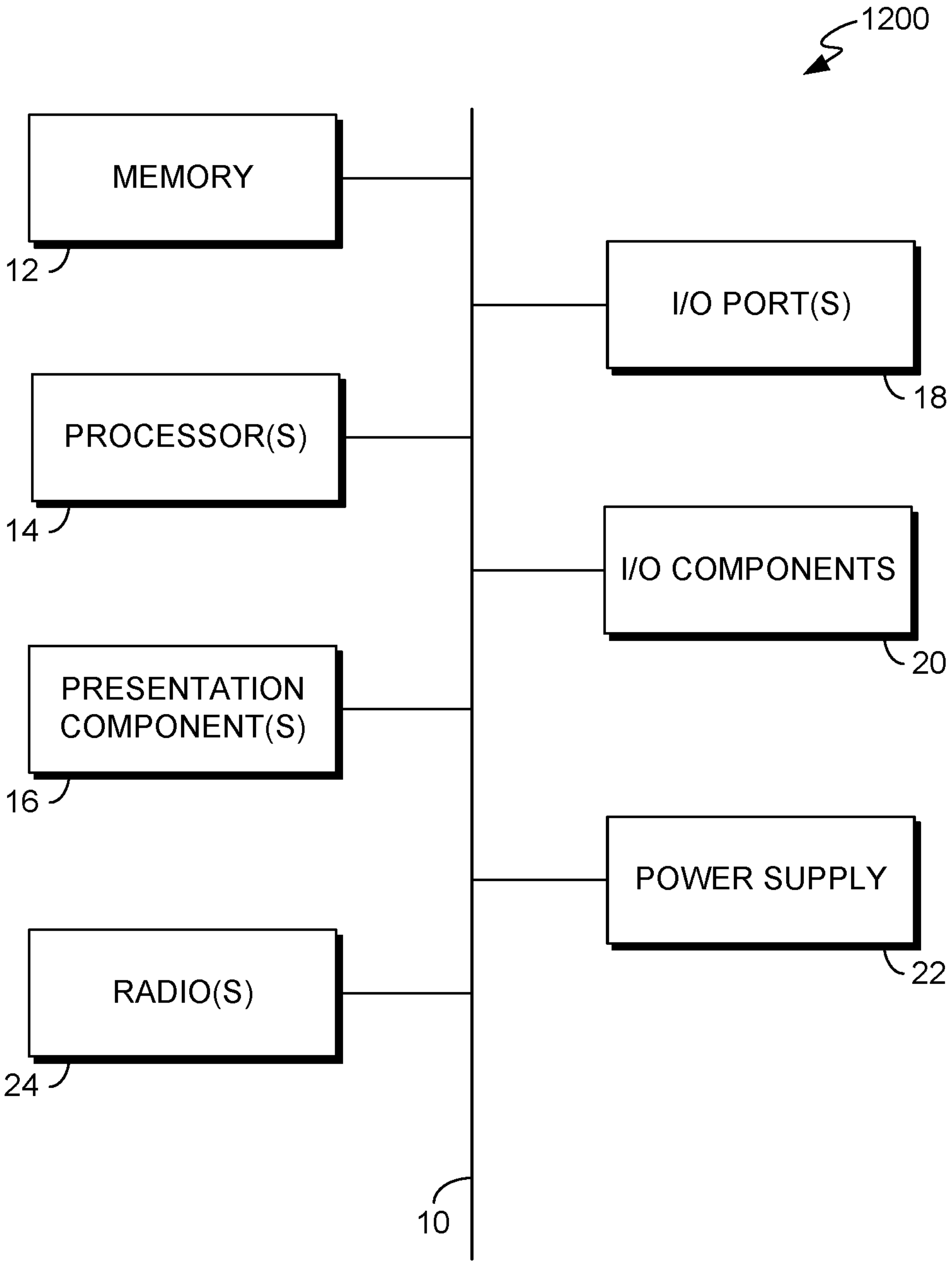
FIG. 12 is a block diagram of an example computing device suitable for use in implementing some embodiments described herein.

Having described various implementations, an exemplary computing environment suitable for implementing embodiments of the disclosure is now described. With reference to FIG. 12, an exemplary computing device is provided and referred to generally as computing device 12. The computing device 12 is but one example of a suitable computing environment and is not intended to suggest any limitation as to the scope of use or functionality of embodiments of the disclosure. Neither should the computing device 12 be interpreted as having any dependency or requirement relating to any one or combination of components illustrated.

Turning to FIG. 12, computing device 12 includes a bus 19 that directly or indirectly couples the following devices: memory 12, one or more processors 14, one or more presentation components 16, one or more input/output (I/O) ports 18, one or more I/O components 20, and an illustrative power supply 22. Bus 19 represents what may be one or more busses (such as an address bus, data bus, or combination thereof). Although the various blocks of FIG. 12 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 12 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 12 and with reference to "computing device."

Computing device 12 typically includes a variety of computer-readable media. Computer-readable media can be any available media that can be accessed by computing device 12 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 12. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 12 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 12 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 12. The computing device 12 may be equipped with depth cameras, such as stereoscopic camera systems, infrared camera systems, RGB camera systems, and combinations of these, for gesture detection and recognition. Additionally, the computing device 12 may be equipped with accelerometers or gyroscopes that enable detection of motion. The output of the accelerometers or gyroscopes may be provided to the display of the computing device 12 to render immersive augmented reality or virtual reality.

Some embodiments of computing device 12 may include one or more radio(s) 24 (or similar wireless communication components). The radio 24 transmits and receives radio or wireless communications. The computing device 12 may be a wireless terminal adapted to receive communications and media over various wireless networks. Computing device 12 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 1, 2, 3, . . . N objects and/or elements, where N is an positive integer with no upper bound. Therefore, as used herein, a set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:

at least one computer processor; and computer storage media storing computer-useable instructions that, when used by the at least one computer processor, cause the at least one computer processor to perform operations comprising:

receiving a first output of a language model based on the language model processing a first input, wherein the first input includes: a request, target content, and an example output comprising a representation that indicates, at least partially how the first output should be formatted, and wherein the first output comprises a first output confidence and first generative text;

providing a second input to the language model, wherein the second input comprises: the target content and the first output, and wherein the second input excludes any examples;

in response to the providing the second input, receiving a second output from the language model, wherein the second output comprises a second output confidence;

comparing the first output confidence and the second output confidence;

based at least in part on the comparing, determining a first hallucination score indicating a likelihood of hallucination in the first output; and based at least in part on the first hallucination score exceeding a threshold: refraining from presenting, at a user device, the first generative text, generating second generative text associated with a second hallucination score that does not exceed the threshold, and causing presentation, at the user device, of the second generative text.

2. The system of claim 1, wherein the operations further comprise:

determine a composite frequency score by summing each frequency score determined for each token; and determine whether the composite frequency score exceeds a second threshold, wherein the determining of the first hallucination score is further based on whether the composite frequency score exceeds the second threshold, and wherein hallucination is likely when the composite frequency score exceeds the second threshold.

3. The system of claim 1, wherein the operations further comprise:

parse the first output into a plurality of sections, each section comprising a portion of the first output;

for a first section of the plurality of sections, generate a veracity request indicative of a request to determine a veracity of the first section; and provide the veracity request of the first section and the target content as third input to the language model.

4. The system of claim 3, wherein the operations further comprise:

in response to the providing of the veracity request, receive a third output of the language model, the third output comprising a reply to the veracity request and a corresponding confidence score that the reply indicates veracity; and based at least in part on the receiving of the third output, generate a third hallucination score that indicates whether hallucination is likely in the first output.

5. The system of claim 1, wherein the operations further comprising: determine a set of tokens, comprising at least one token, occurring in the first output that are not found in the target content but are found to occur in the example output; and based at least in part on the determining the set of tokens, for each token of the set of tokens, determine a frequency score indicating occurrence frequency for the token, and wherein the determining of the frequency score comprises dividing the token's occurrence frequency in the example output by a frequency of the token occurring in multiple data sources, the dividing resulting in a quotient, and taking 1 minus the quotient.

6. The system of claim 1, wherein the target content includes one of: a meeting transcript, a file, or a document.

7. The system of claim 1, wherein the example output corresponds to one-shot or few-shot prompting.

8. A computer-implemented method comprising:

receiving a first output of a language model based on the language model processing a first input, wherein the first input comprises: a first request, target content, and one or more examples, the one or more examples include one or more model outputs associated with the first request, and wherein the first output comprises a first output confidence and first generative text;

providing a second input to the language model, wherein the second input comprises: the target content and the first output, and wherein the second input excludes any examples;

in response to the providing the second input, receiving a second output from the language model, wherein the second output comprises a second output confidence;

comparing the first output confidence and the second output confidence;

based at least in part on the comparing, generating a first hallucination score that indicates a likelihood that hallucination exists in the first output; and based at least in part on the first hallucination score exceeding a threshold: refraining from presenting, at a user device, the first generative text, generating second generative text associated with a second hallucination score that does not exceed the threshold, and causing presentation, at the user device, of the second generative text.

9. The computer-implemented method of claim 8, further comprising:

determining a set of tokens occurring in the first output that are not found in the target content but are found to occur in at least one example, of the one or more examples;

based at least in part on the determining, for each token of the set of tokens, determining a frequency score indicating how common the token is; and based at least in part on the determining of the frequency score for each token of the set of tokens, determining a third hallucination score indicating another likelihood that hallucination exists in the first output.

10. The computer-implemented method of claim 9, further comprising:

determining a composite frequency score from the frequency score of the set of tokens; and determining whether the composite frequency score exceeds a second threshold, wherein the generating of the third hallucination score is further based on whether the composite frequency score exceeds the second threshold.

11. The computer-implemented method of claim 8, further comprising:

parsing the first output into a plurality of sections, each section comprising a portion of the first output;

for each section of the plurality of sections, generating a veracity request indicative of a request to determine a veracity of the section; and providing each veracity request for each section and the target content as third input to the language model.

12. The computer-implemented method of claim 11, further comprising:

in response to the providing of each veracity request, receiving a third output of the language model, the third output comprises a reply to the veracity request and a corresponding confidence score that the reply is yes; and based at least in part on the receiving of the third output, generating a third hallucination score that indicates whether hallucination is likely in the first output.

13. The computer-implemented method of claim 8, wherein the generating of the first hallucination score comprises:

computing a difference between the first output confidence and the second output confidence;

determining whether the difference exceeds a second threshold; and generating the first hallucination score based on whether the difference exceeds the second threshold, wherein the hallucination likely exists if the first hallucination score exceeds the second threshold and the hallucination likely does not exist if the first hallucination score does not exceed the second threshold.

14. One or more computer storage media having computer-executable instructions embodied thereon that, when executed, by one or more processors, cause the one or more processors to perform operations comprising:

receiving a first output of a language model based on the language model processing a first input, wherein the first input comprises a request, target content, and one or more examples, the one or more examples include one or more model outputs associated with the request, and wherein the first output comprises a first output confidence and first generative text;

providing a second input to the language model, wherein the second input comprises: the target content and the first output, and wherein the second input excludes any examples;

in response to the providing the second input, receiving a second output from the language model, wherein the second output comprises a second output confidence;

comparing the first output confidence and the second output confidence;

based at least in part on the comparing, generating a first hallucination score that indicates whether hallucination is likely in the first output; and based at least in part on the first hallucination score exceeding a threshold, refraining from presenting, at a user device, the first generative text and causing presentation, at the user device, of second generative text associated with a second hallucination score that does not exceed the threshold.

15. The one or more computer storage media of claim 14, wherein the generating of the first hallucination score comprises:

determining a composite confidence score by summing, for each section, a corresponding confidence score that a reply confirms veracity;

evaluating a composite frequency score against a second threshold; and based on the composite frequency score exceeding the second threshold, generating the first hallucination score indicating that there is likely hallucination in the first output.

* * * * *